US007722791B2

(12) United States Patent
Kimura et al.

(10) Patent No.: US 7,722,791 B2
(45) Date of Patent: May 25, 2010

(54) METHOD FOR MANUFACTURING HONEYCOMB STRUCTURE AND MANUFACTURING APPARATUS THEREOF

(75) Inventors: Koji Kimura, Nagoya (JP); Takuya Nunome, Nagoya (JP); Ryuichi Shoji, Tokyo (JP); Yoshimasa Kondo, Nagoya (JP); Hiroyuki Tsuji, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/174,699

(22) Filed: Jul. 17, 2008

(65) Prior Publication Data

US 2009/0181167 A1 Jul. 16, 2009

(30) Foreign Application Priority Data

Jul. 18, 2007 (JP) ............................ 2007-186762

(51) Int. Cl.
*B23K 26/36* (2006.01)
*B29C 35/08* (2006.01)
*B29C 47/00* (2006.01)
*B01D 39/20* (2006.01)

(52) U.S. Cl. ....................... 264/275; 425/503; 425/113; 425/174.4; 425/112; 264/154; 264/259; 156/89.11

(58) Field of Classification Search ................. 425/503, 425/113, 174.4, 112; 264/259, 275, 154; 156/89.11
See application file for complete search history.

(56) References Cited

U.S. PATENT DOCUMENTS 1,826,651 A * 10/1931 Chisholm ................... 425/221
4,557,773 A * 12/1985 Bonzo ......................... 156/64
4,573,896 A 3/1986 Bonzo
4,715,801 A * 12/1987 Montierth ................... 425/110
5,034,076 A * 7/1991 Masui et al. .................. 156/79
6,716,019 B2 * 4/2004 Yamaguchi et al. ......... 425/198

(Continued)

FOREIGN PATENT DOCUMENTS

JP 58-037480 A1 3/1983

(Continued)

OTHER PUBLICATIONS

U.S. Appl. No. 12/174,703, filed Jul. 17, 2008, Shoji et al.

*Primary Examiner*—Joseph S Del Sole
*Assistant Examiner*—Nahida Sultana
(74) *Attorney, Agent, or Firm*—Burr & Brown

(57) ABSTRACT

A method of manufacturing a honeycomb structure having a plugged portion, wherein a mask is applied to the honeycomb structure, a plugging material is supplied on the mask or on the same plane as a surface of the mask, and a pressurizing apparatus disposed at an acute angle with respect to the surface of the mask and having a pressurizing face for pressurizing the plugging material is moved to fill the plugging material into the cells of the honeycomb structure. The pressurizing apparatus is moved on the mask with a part of the region of the pressurizing face being brought into surface contact with the mask via the plugging material to pressurize the plugging material toward the cell side and to push out an extra plugging material in the direction of movement to further pressurize and fill the material into the cells with forming the region of the surface contact.

32 Claims, 35 Drawing Sheets

U.S. PATENT DOCUMENTS

| | | | | |
|---|---|---|---|---|
| 7,320,183 | B2 * | 1/2008 | Ishii et al. | 34/429 |
| 7,413,625 | B2 * | 8/2008 | Fujita et al. | 156/312 |
| 2002/0020944 | A1 | 2/2002 | Yamaguchi et al. | |
| 2002/0185779 | A1 * | 12/2002 | Renault et al. | 264/259 |
| 2005/0076991 | A1 * | 4/2005 | Fujita | 156/89.22 |
| 2006/0150598 | A1 | 7/2006 | Ichikawa et al. | |
| 2007/0114700 | A1 * | 5/2007 | Andrewlavage et al. | 264/400 |
| 2007/0184241 | A1 * | 8/2007 | Ichikawa | 428/117 |
| 2007/0210485 | A1 * | 9/2007 | Hatano et al. | 264/259 |
| 2007/0221312 | A1 * | 9/2007 | Ichikawa | 156/89.11 |
| 2008/0079194 | A1 * | 4/2008 | Kumagae et al. | 264/259 |
| 2008/0116601 | A1 * | 5/2008 | Naruse et al. | 264/177.12 |
| 2009/0243139 | A1 * | 10/2009 | Tsuji et al. | 264/154 |

FOREIGN PATENT DOCUMENTS

| | | | |
|---|---|---|---|
| JP | 01-297114 | A1 | 11/1989 |
| JP | 05-013953 | A1 | 1/1993 |
| JP | 08-189338 | A1 | 7/1996 |
| JP | 2001-300922 | A1 | 10/2001 |
| JP | 2001-334114 | A1 | 12/2001 |
| JP | 2002-028915 | A1 | 1/2002 |
| JP | 2003-320517 | A1 | 11/2003 |
| JP | 2006-310788 | A1 | 11/2006 |
| JP | 2007-157992 | A1 | 6/2007 |
| JP | 2007-283286 | A1 | 11/2007 |
| WO | 2004/085029 | A1 | 10/2004 |

* cited by examiner

METHOD FOR MANUFACTURING HONEYCOMB STRUCTURE AND MANUFACTURING APPARATUS THEREOF

BACKGROUND OF THE INVENTION AND RELATED ART STATEMENT

The present invention relates to a method for manufacturing a honeycomb structure having plugging portions formed in at least a part of the opening end portions of the cells of the honeycomb structure, and it also relates to a manufacturing apparatus of the structure.

A requirement for removing particulate matter and toxic substances contained in exhaust gas discharged from internal combustion engines, boilers and the like has grown in light of influence on environment. In particular, regulations on removal of particulate matter (hereinafter sometimes referred to as particulate matter (PM)) discharged from diesel engines tend to be strengthen in Europe and the United States as well as Japan, and a honeycomb structure is used in a trapping filter for removing the PM.

Examples of the filter used for such a purpose include a honeycomb filter utilizing a plugged honeycomb structure including a honeycomb structure in which a plurality of cells constituting fluid passages are partitioned and formed by porous partition walls by the partition walls and plugging portions which alternately plug one opening end and the other opening end of each of the cells. According to such a honeycomb filter, an exhaust gas G1 is allowed to flow into cells from the exhaust gas inflow side end face of the filter, whereby particulates contained in the exhaust gas are trapped by the partition walls when the exhaust gas G1 passes through the partition walls. In consequence, a purified gas G2 from which the particulates have been removed can be discharged from the purified gas outflow side end face of the filter.

Moreover, as a method for manufacturing the above-mentioned plugged honeycomb structure, for example, there is proposed a method which includes the steps of attaching an adhesive sheet or the like to one end face of a honeycomb structure (a non-fired dried ceramic body); making holes in only the portions corresponding to the cells to be plugged (plugged cells) in the adhesive sheet or the like by laser processing or the like using image processing to form a mask; immersing, in slurry (ceramic slurry), the end face of the honeycomb structure to which the mask is attached to fill the slurry into the cells to be plugged, thereby forming plugging portions; subjecting the other end face of the honeycomb structure to the same steps; and drying and firing the honeycomb structure to obtain the plugged honeycomb structure (e.g., see Patent Document 1).

[Patent Document 1] JP-A-2001-300922

However, according to the method of making the holes in the adhesive sheet and immersing, in slurry, the honeycomb structure provided with this adhesive sheet as the mask as described above, operation time is required for leveling the slurry in which the structure is to be immersed, and this is a factor for cost increase. Moreover, the leveling is very delicate, and an outer peripheral portion becomes thick or thin owing to slight displacement, so that it is difficult to obtain a uniform plugging depth. A leveling accuracy matches a depth accuracy, so that considerable amounts of labor and time are required for the leveling step. In particular, when a large-sized honeycomb structure is subjected to plugging in the same manner, it is more difficult. Moreover, a film attached to the structure needs to be folded in a large amount so that a side face portion of the immersed honeycomb structure is not made dirty, but it is not easy to appropriately fold the film. In addition, peeling off requires great care.

SUMMARY OF THE INVENTION

An object of the present invention is to provide a method for manufacturing a honeycomb structure having plugging portions, which is capable of shortening manufacturing time to decrease manufacturing cost regardless of the size of the honeycomb structure, and a manufacturing apparatus of the honeycomb structure having plugging portions. In addition, another object of the present invention is to provide method for manufacturing a high-performance honeycomb structure having a plugged portion, which hardly causes change in local pressure loss by realizing a uniform plugging depth and a manufacturing apparatus of the honeycomb structure.

It has been found that the above object can be achieved by applying a mask on a honeycomb structure and moving a pressurizing member disposed on the surface of the mask at an acute angle with respect to the surface of the mask and having a pressurizing face for pressurizing a plugging material to fill the plugging material into cells of the honeycomb structure. That is, according to the present invention, a method for manufacturing a honeycomb structure having plugging portions and a manufacturing apparatus of the honeycomb structure having plugging portions are provided as follows.

According to a first aspect of the present invention, a method for manufacturing a honeycomb structure having plugging portions is provided, the honeycomb structure having porous partition walls and a plurality of cells partitioned by the partition walls and formed so as to extend through the honeycomb structure from one end face of the honeycomb structure to the other end face thereof, the method comprising the steps of: attaching a mask having openings corresponding to openings of at least a part of the cells to the end faces of the honeycomb structure; supplying a plugging material having fluidity on the mask or on the same plane as a surface of the mask; and moving a pressurizing member disposed at an acute angle with respect to the surface of the mask and having a pressurizing face for pressurizing the plugging material to fill the plugging material into the cells of the honeycomb structure by pressurizing the plugging material with the pressurizing face.

According to a second aspect of the present invention, the method for manufacturing the honeycomb structure having plugging portions according to the first aspect is provided, wherein the pressurizing face is a flat face and disposed at an angle of 2° or more and 55° or less with respect to the surface of the mask.

According to a third aspect of the present invention, the method for manufacturing the honeycomb structure having plugging portions according to the first aspect is provided, wherein the pressurizing face is a curved face protruding toward the mask side.

According to a fourth aspect of the present invention, the method for manufacturing the honeycomb structure having plugging portions according to any one of the first to third aspects is provided, wherein the mask is moved with a part of the pressurizing face being brought into contact with the mask via the plugging material to pressurize the plugging material toward the cell side and to push out an extra plugging material in the direction of movement of the mask, and the plugging material is filled into the cells with forming a region of face contact.

According to a fifth aspect of the present invention, the method for manufacturing the honeycomb structure having plugging portion according to any one of the first to fourth aspects is provided, wherein the honeycomb structure and the plugging material of the honeycomb structure contain a ceramic selected from the group consisting of cordierite, mullite, alumina, silicon carbide, and a combination thereof.

According to a sixth aspect of the present invention, the method for manufacturing the honeycomb structure having plugging portions according to any one of the first to fifth aspects is provided, wherein the mask is obtained by forming holes in the film by a laser after attaching the film to the end faces of the honeycomb structure.

According to a seventh aspect of the present invention, the method for manufacturing the honeycomb structure having plugging portions according to any one of the first to sixth aspects is provided, wherein, upon positioning a table portion having a through-hole where the end face portion of the honeycomb structure is to be inserted and the honeycomb structure by inserting the end face portion of the honeycomb structure, the mask is provided on the end face, a remaining portion of the mask is folded on the side face portion, an end portion on the end face side of the side face portion of the honeycomb structure where at least a part of the mask adheres to the side face portion is held with a sealing member to seal a gap between the side face portion of the honeycomb structure and the table portion with the sealing member, and a plugging material having fluidity is supplied onto the mask or the table portion on the same plane as the surface of the mask to fill the plugging material into the cells.

According to an eighth aspect of the present invention, the method for manufacturing the honeycomb structure having plugging portions according to the seventh aspect is provided, wherein the sealing member is a hollow elastic ring, and sealing is performed by expanding the hollow elastic ring by air pressure.

According to a ninth aspect of the present invention, a manufacturing apparatus for a honeycomb structure having plugging portions is provided, the apparatus comprising: a table portion having a through-hole into which an end face portion of a honeycomb structure is to be inserted, the honeycomb structure having porous partition walls and a plurality of cells partitioned by the partition walls and formed so as to extend through the honeycomb structure from one end face of the honeycomb structure to the other end face thereof; a positioning means for positioning and holding the table portion and the honeycomb structure in a state that the end face portion of the honeycomb structure is inserted into the through-hole of the table portion; a plugging material supply means for supplying a plugging material having fluidity onto the mask or onto the table portion in a state that the mask having openings corresponding with openings of at least a part of the cells is disposed on the end face of the honeycomb structure; and a pressurizing means having a pressurizing face disposed at an acute angle with respect to a surface of the mask and applying pressure to the plugging material and a moving means for moving the honeycomb structure on the table; wherein, after supplying the plugging material on the mask of the honeycomb structure positioned with respect to the table portion or on the table portion, the pressurizing means moves on the table portion, thereby pressurizing the plugging material supplied on the mask by the pressurizing face to fill the plugging material into the cells of the honeycomb structure.

According to a tenth aspect of the present invention, the manufacturing apparatus for a honeycomb structure having plugging portions according to the ninth aspect is provided, wherein the pressurizing face is a flat face and has an angle of 2° or more and 55° or less with respect to the surface of the mask.

According to an eleventh aspect of the present invention, the manufacturing apparatus for a honeycomb structure having plugging portions according to the ninth aspect is provided, wherein the pressurizing face is a curved face protruding toward the mask side.

According to a twelfth aspect of the present invention, the manufacturing apparatus for a honeycomb structure having plugging portions according to ninth to eleventh aspects is provided, wherein the pressurizing face is capable of elastic deformation and a part of the pressurizing face is brought into surface contact with the mask via the plugging material, moves on the mask to pressurize the plugging material toward the cell side and to push out an extra plugging material in a moving direction, and further pressurizing and filling the plugging material into the cells with forming a region of surface contact.

According to a thirteenth aspect of the present invention, the manufacturing apparatus for a honeycomb structure having plugging portions according to any one of the ninth to twelfth aspects is provided, wherein the plugging material supply means is provided on the pressurizing means and moves unitarily with the pressurizing means.

According to a fourteenth aspect of the present invention, the manufacturing apparatus for a honeycomb structure having plugging portions according to any one of the ninth to thirteenth aspects is provided, wherein the mask is a film attached so as to cover the end face of the honeycomb structure.

According to a fifteenth aspect of the present invention, the manufacturing apparatus for a honeycomb structure having plugging portions according to any one of the ninth to fourteenth aspects is provided, wherein the pressurizing means includes a pressurizing mechanism for moving the pressurizing face in a direction perpendicular to the surface of the mask and a driving mechanism for moving the pressurizing face along the surface of the mask.

According to a sixteenth aspect of the present invention, the manufacturing apparatus for a honeycomb structure having plugging portions according to any one of the ninth to fifteenth aspects is provided, wherein the table portion has side wall portions formed to protrude from the surface in parallel with the moving direction of the pressurizing means on both sides of the through-hole on the surface of the table portion and inhibiting the plugging material from leaking out from the surface of the table portion.

According to a seventeenth aspect of the present invention, the manufacturing apparatus for a honeycomb structure having plugging portions according to any one of the ninth to sixteenth aspects is provided, wherein the apparatus has a sealing mechanism for inhibiting the extra plugging material pushed out by the pressurizing face by sealing the gap between the side face portion of the honeycomb structure and the table portion with a sealing member by holding an end portion on the end face side of the side face portion of the honeycomb structure where the mask is provided on the end face in the state that the remaining portion of the mask is folded toward the side face portion and that at least a part of the mask is adhered to the side face portion with the sealing member whose contact portion with the side face portion of the honeycomb structure is constituted to be movable upon positioning the table portion and the honeycomb structure by inserting the end face portion of the honeycomb structure into the through-hole of the table portion.

According to an eighteenth aspect of the present invention, the manufacturing apparatus for a honeycomb structure having plugging portions according to the seventeenth aspect is provided, wherein the sealing member is a hollow elastic ring, and sealing is performed by expanding the hollow elastic ring by air pressure.

According to a nineteenth aspect of the present invention, the manufacturing apparatus for a honeycomb structure having plugging portions according to any one of the ninth to eighteenth aspects is provided, wherein the pressurizing means has the first pressurizing face and the second pressurizing face as two slant faces, the lower ends of the first pressurizing face and the second pressurizing face are connected with each other to form a joint portion, a cross section is formed in a protruding shape by the first pressurizing face and the second pressurizing face with the joint portion as a tip portion, the pressurizing means moves in a forward direction on the table portion to fill the plugging material by the first pressurizing face and a backward direction to fill the plugging material by the second pressurizing face.

According to a twentieth aspect of the present invention, the manufacturing apparatus for a honeycomb structure having plugging portions according to the nineteenth aspect is provided, wherein a plugging material supply hole for supplying the plugging material having fluidity on the mask or on the table portion is formed on the first pressurizing face and the second pressurizing face.

A mask is applied on the honeycomb structure, a plugging material having fluidity is supplied on the mask or on the same plane as the mask, a pressurizing member disposed at an acute angle with respect to the surface of the mask and having a pressurizing face for pressurizing a plugging material and on the surface of the mask, and the plugging material is pressurized by the pressurizing face to fill the plugging material into the cells of the honeycomb structure. Unlike a conventional method where the end face of the honeycomb structure is immersed in the leveled plugging material, manufacturing time can be shortened. Further, since the plugging material is filled under pressurization by the pressurizing member, plugging can be conducted securely, and plugging depth can be stabilized. Therefore, faulty plugging is hardly caused with high reliability, and improvement in performance can be promoted.

Furthermore, effects will specifically be described. According to the first and ninth aspects, since a practical pressurized area is small with respect to the work (honeycomb structure) size to make uniformalization of pressure distribution easy, plugging having high controllability and less fluctuation of plugging depth can be realized. A manufacturing method of a honeycomb structure having plugging portions of the present invention is particularly suitable for shallow plugging and can be used advantageously as a manufacturing method of a diesel particulate filter (DPF) or the like having a large effective area to be capable of filtering more effectively.

According to the second and tenth aspects, pressurization is possible with securing the plugging material amount required for the plugging. By adjusting the angle within the range from 2° to 55°, plugging depth can intentionally be controlled.

According to the third and eleventh aspects, surface contact is possible even with a pressurizing member which is not elastic, and effective plugging can be realized with securing the plugging material amount. By adjusting the setting angle and the curvature, the depth can be controlled more precisely.

According to the fourth aspect, an end face of a product can be made clean at the same time by effectively forming the pressurizing portion and scraping off the plugging finish portion.

According to the fifth aspect, by using these ceramic materials, a DPF or the like having good filtering efficiency can be manufactured by the use of these ceramic materials.

According to the sixth and fourteenth aspects, high-speed and precise hole-making can be realized by using a laser (not needle or the like). In addition, tooling change is not required at the same time, which is advantageous from the viewpoint of steps. Further, a thin mask is realized at low cost, and there is an effect in reducing wasteful plugging material corresponding with the thickness of the mask.

According to the seventh, eighth, seventeenth and eighteenth aspects, since the sealing mechanism has a sealing member in a portion which is brought into contact with the honeycomb structure, the gap between the sealing mechanism and the honeycomb structure is infilled, leakage of the plugging material to the lower face of the honeycomb structure is inhibited, and the plugging material can be used effectively. In addition, holding force of the honeycomb structure is enhanced, and therefore inclining and moving of the honeycomb structure upon pressurization can be inhibited. Therefore, uniform pressurization is possible, and fluctuations of plugging depth can be reduced. Further, since the elastic ring follows the shape of the honeycomb structure, the honeycomb structure can have an arbitrary shape.

According to the twelfth aspect, the surface contact is realized by using an elastic body, and plugging can be performed effectively and deeply.

According to the thirteenth aspect, the time required for supply can be minimized by unitarily moving a supply means.

According to the fifteenth aspect, the pressurizing means can be moved with plugging under pressure.

According to the sixteenth aspect, leakage of the plugging material from the side portion of the pressurizing face, and utilization efficiency of the plugging material can be enhanced. In addition, since pressure does not escape from the side of the pressurizing face, pressure can be applied uniformly, and plugging having little fluctuations can be realized.

According to the nineteenth aspect, the plugging material can be filled in the forward direction and in the backward direction.

According to the twentieth aspect, the plugging material having fluidity can be supplied on the mask or on the table portion by the plugging material supply hole.

DESCRIPTION OF REFERENCE NUMERALS USED IN THE DRAWINGS

1: honeycomb structure; 1*s*: side face portion; 2: partition wall; 3: cell; 8: end face; 11: table portion; 11*h*: through-hole; 11*k*: notch portion; 11*w*: side wall portion; 12: support base; 15: image-picking apparatus; 16: laser; 21: roller; 22: motor; 23: plugging material supply apparatus; 24: plugging apparatus; 24*a*: main body portion; 24*b*: elastic body; 24*c*: second elastic body; 24*g*: gap; 24*h*: plane joint portion; 24*k*: plugging material supply hole; 24*r*: R tip portion; 24*s*: pressurizing face; 24*v*: V-shaped plugging apparatus; 24W: flat plugging apparatus; 25: film; 27: peeling apparatus; 28: plate-like member; 29: drying apparatus; 31: plugging material; 35: sealing member; 40: depression; 41: stopper member.

DETAILED DESCRIPTION OF THE INVENTION

Embodiments of the present invention will hereinafter be described with reference to the drawings. However, the present invention is not limited to the following embodiments and can be changed, modified or improved without deviating from the scope of the present invention.

Figure 1:
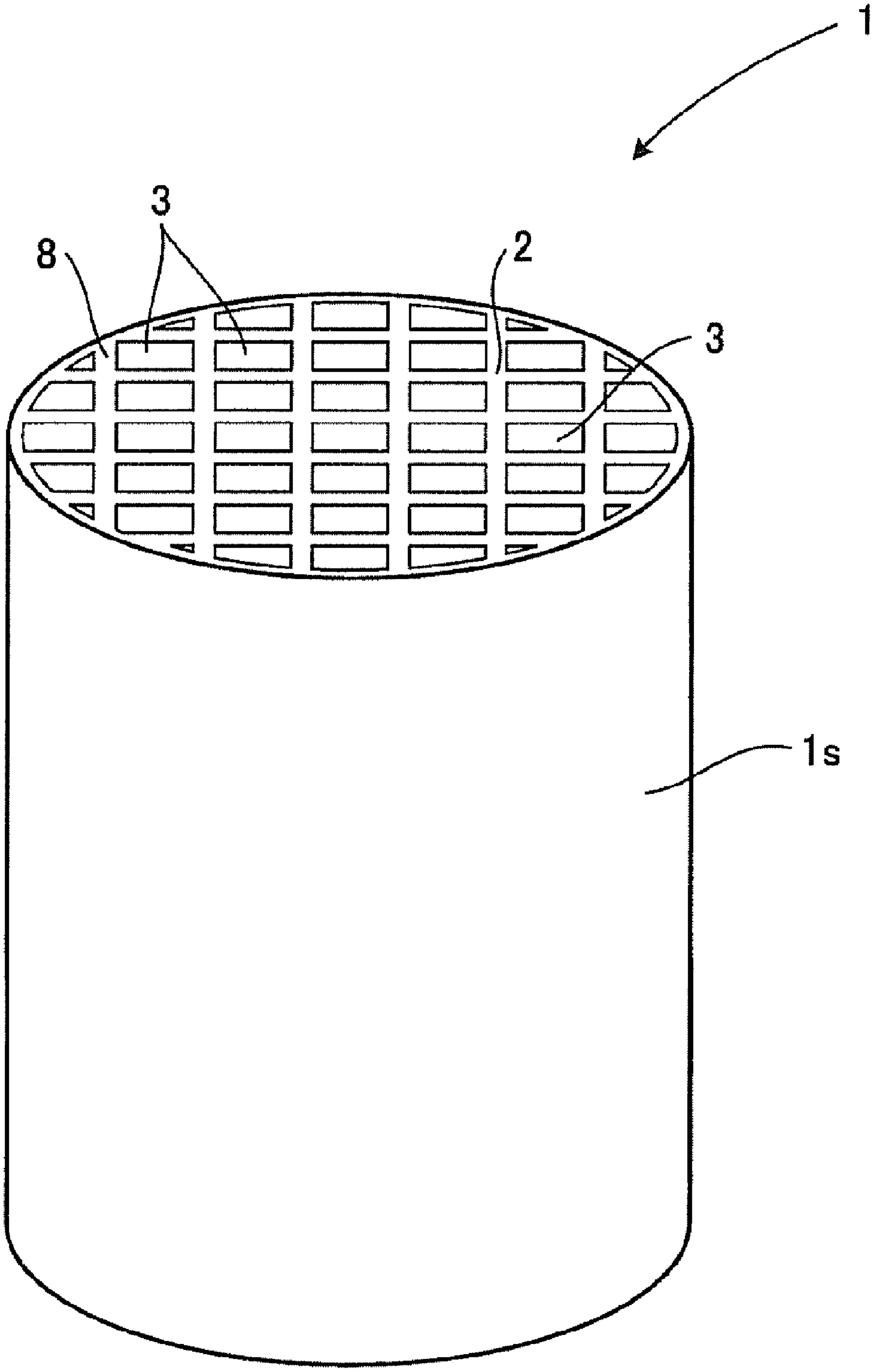
FIG. 1 shows one embodiment of a honeycomb structure to be plugged.

As shown in, for example, FIG. 1, a honeycomb structure 1 to be plugged has porous partition walls 2, and a plurality of cells 3 are partitioned and formed by the partition walls 2 and formed so as to extend through the structure from one end face 8 of the structure to the other end face 8 thereof. The structure is formed of a ceramic material. More specifically, the honeycomb structure contains a ceramic material preferably selected from the group consisting of cordierite, mullite, alumina, silicon carbide and a combination of them from viewpoints of strength, thermal resistance and the like.

Then, a plastic clay is prepared by adding a binder, an organic pore former, a surfactant, water and the like to the above raw material, and the clay is subjected to, for example, extrusion forming to form the columnar honeycomb structure 1 having a large number of cells 3 which are partitioned by the partition walls 2 and which extend through the structure in an axial direction.

Figure 2:
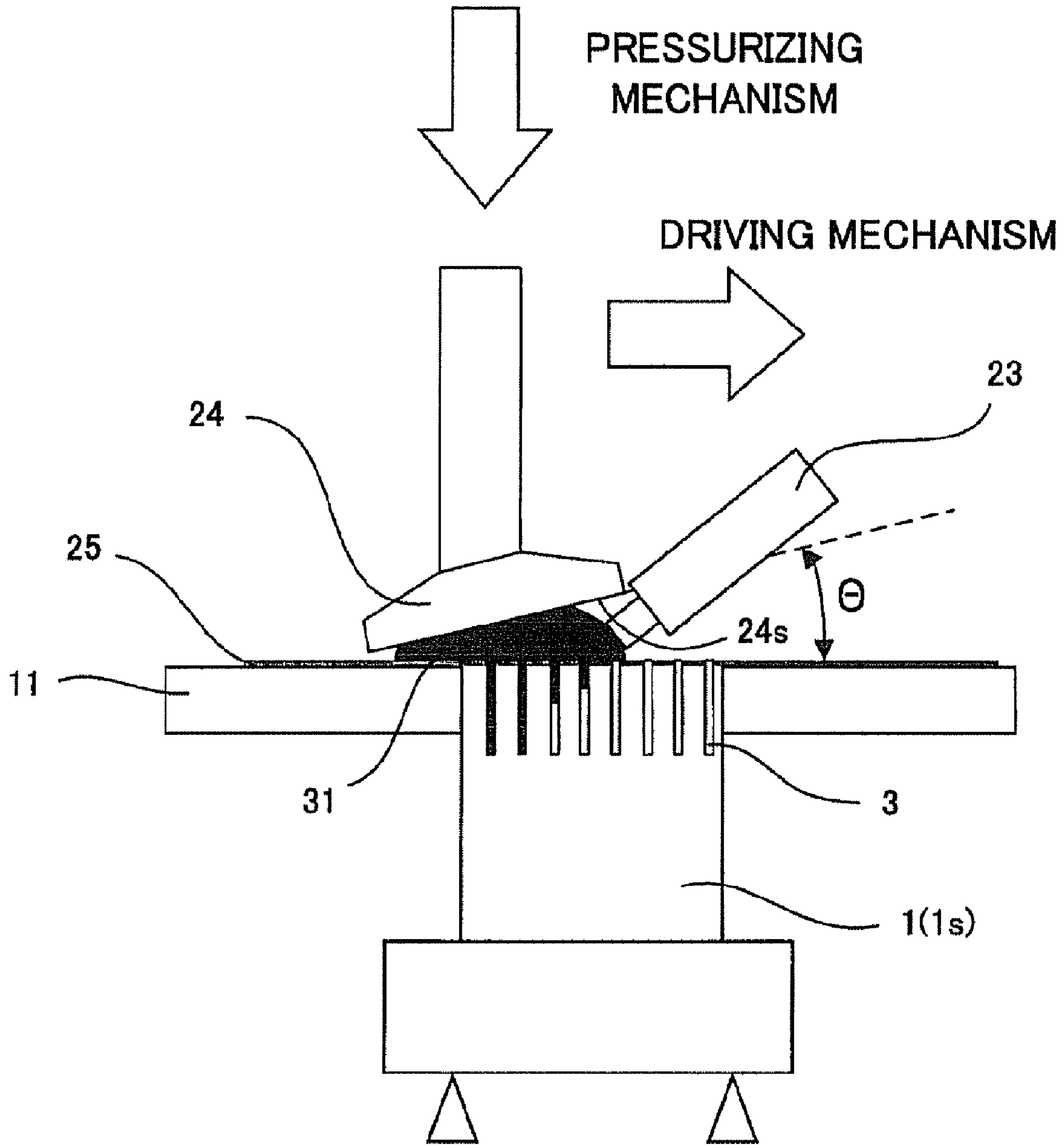
FIG. 2 is a diagram schematically showing filling under pressure.

The outline of a method for plugging the honeycomb structure 1 of the present invention will be described with reference to FIG. 2. To plug the cells 3 of the honeycomb structure 1, in a state where the honeycomb structure 1 is positioned in a table portion 11 (see FIG. 3A) having a through-hole 11*h* into which the end face portion of the honeycomb structure 1 is to be inserted as shown in FIG. 2, a film 25 is attached to the end face 8 so that a side surface portion is of the honeycomb structure 1 is not covered. Moreover, in a state where a remaining portion of the film 25 which is not attached to the end face 8 is attached to the table portion 11, the film 25 is held in a flat state. Then, holes opened so as to correspond to the openings of a part of the cells 3 are formed in the film 25 to form the film 25 as a mask, a plugging material 31 (slurry or paste) having fluidity is supplied onto the mask or the same plane as the mask, and the plugging apparatus 24 as a pressurizing member disposed at an acute angle with respect to the surface and having a pressurizing face 24*s* for pressurizing a plugging material 31 to pressurize the plugging material 31 by the pressurizing face 24*s*, thereby filling the plugging material 31 into the cells 3 of the honeycomb structure 1.

Figure 12:
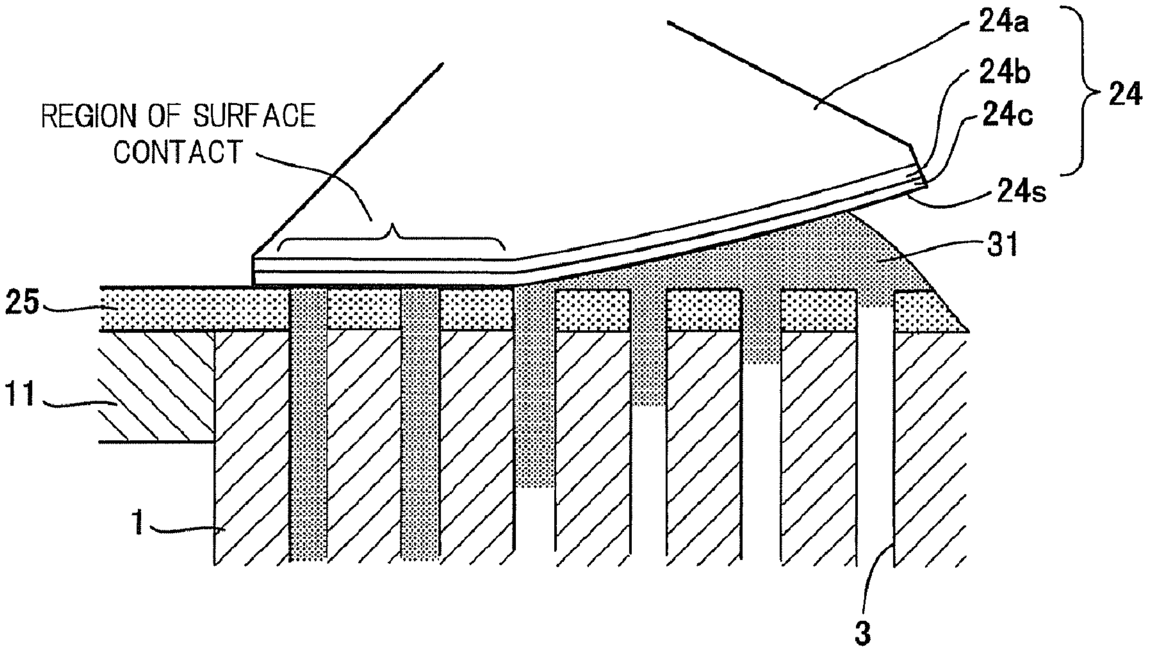
FIG. 12 is a diagram showing pressurization and filling by surface contact.
Figure 20:
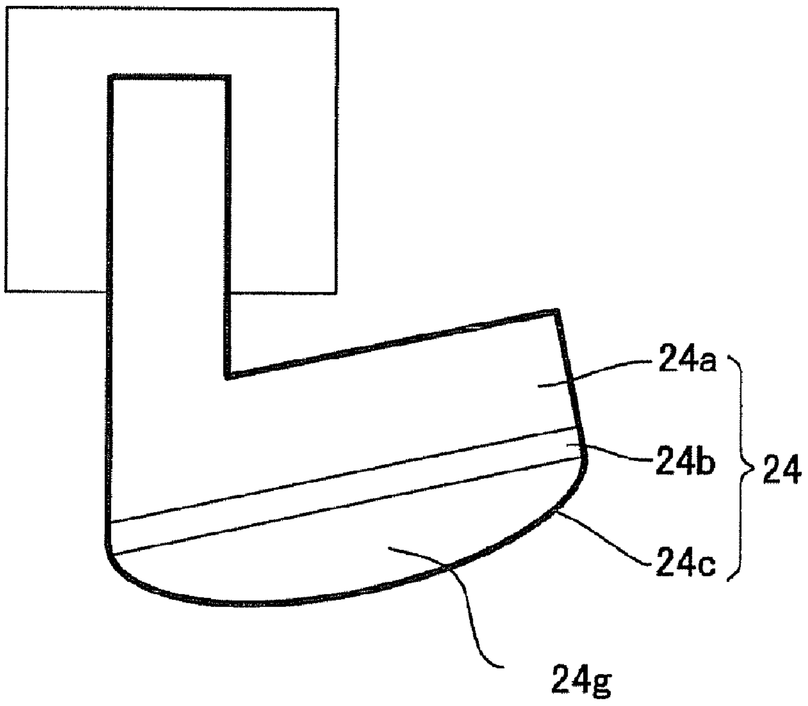
FIG. 20 is a diagram showing a plugging apparatus provided with a gap between elastic bodies.

As shown in FIG. 2, when the pressurizing face 24*s* is a flat face, the angle θ of the pressurizing face 24*s* with respect to the surface of the mask (film 25) is made acute. Further, it is preferable that the pressurizing face 24*s* is formed of an elastic body so as to deform by being pressed against the mask and that a part of the pressurizing face 24*s* is brought into surface contact with the mask. Specifically, as shown in FIG. 12, the plugging apparatus 24 has a three-layered structure having a main body portion 24*a* formed of a rigid body, an elastic body 24*b* having a thickness of 2 to 4 mm and attached to the main body portion 24*a*, and the second elastic body 24*c* having a hardness higher than that of the elastic body 24*b* and a thickness of 50 to 400 μm further on the outside thereof. For example, the main body portion 24*a* of the plugging apparatus 24 is formed of metal, and a rubber plate and a polyester film are attached on the metal so that the rubber plate and the polyester film may form a pressurizing face 24*s*. Further, as shown in FIG. 20, a gap 24*g* may be formed between the elastic bodies. By such a three-layered structure, there can be obtained an effect in reducing fluctuations of plugging depth and an effect in inhibiting damages in the honeycomb structure 1 due to improvement in following capability. Further, there can be obtained an effect in improving plugging speed due to reduction in friction.

The elastic body 24*b* having a thickness of 2 to 4 mm has an effect in reducing fluctuations of plugging depth and an effect in inhibiting damages in a sample due to mainly improvement in following capability. When it is less than 2 mm, following capability is insufficient, and the angle of the pressurizing face 24*s* is changed by fluctuations of height of the honeycomb structure 1, which is not preferable. When it is more than 4 mm, the deformation amount is large, and the effect of the angle of the pressurizing face 24*s* is not sufficiently obtained. The second elastic body 24*c* having a thickness of 50 to 400 μm mainly has an effect in improving the printing speed. When it is less than 50 μm, the body is too thin to obtain a sufficient friction-reducing effect. When it is more than 400 μm, sample roughness cannot be absorbed to increase fluctuations of plugging depth.

For the elastic body 24*b*, for example, urethane, butyl rubber, natural rubber, and silicon rubber may be used. For the second elastic body 24*c*, for example, a PET film and MC nylon may be used. Further, by providing a gap 24*g*, a deformed elastic body plays a role of a guide to make rolling of the paste appropriate. Incidentally, though the sealing apparatus 24 can reduce fluctuation even with a two-layered structure having the main body portion 24*a* formed of a rigid body and the elastic body 24*b* attached to the main body portion 24*a*, a three-layered structure is preferable from the viewpoint of improvement in printing speed.

Then, as shown in FIG. 12, a part of the region of the pressurizing face 24*s* is moved on the mask with subjecting the pressurizing face 24*s* to surface contact with the mask via the plugging material 31 to pressurize the plugging material 31 toward the cells 3 side and to push out the extra plugging material 31 in the moving direction, and further the plugging material 31 is pressurized and filled into the cells 3 with forming the region of surface contact. The angle of the plugging apparatus 24 can be adjusted by the main body portion 24*a*, and by adjusting the angle of the plugging apparatus 24, the plugging depth of the honeycomb structure 1 can be controlled even when the material composition of the plugging material 31 is changed.

Heretofore, the plugging material 31 has been put into a container and leveled, and the honeycomb structure 1 has been immersed into the material to plug the cells. However, the cells are plugged as in the present application, whereby time required for plugging the cells can be shortened, and manufacturing cost can be decreased. In addition, since filling is conducted with surface contact, fluctuations of depth for filling can be reduced. Further, since the plugging material 31 is securely filled by the pressurizing face 24*s* even for shallow plugging, filling fault is hardly caused.

Embodiment 1

A specific plugging method will be described with reference to FIGS. 2 to 9. A manufacturing apparatus of a plugged honeycomb structure 1 for use in a plugging method of the present invention includes a table portion 11 having a through-hole 11*h* where an end face portion of a honeycomb structure 1 is to be inserted, the honeycomb structure having porous partition walls 2 and a plurality of cells extending from one end face 8 to the other end face 8 and formed and partitioned by the partition walls 2; a positioning means for positioning the table portion 11 and the honeycomb structure 1 in a state that an end face portion is inserted into the through-hole 11*h* of the table portion 11 and holding the table portion 11 and the honeycomb structure 1; a plugging material supply means for supplying a plugging material 31 having fluidity onto the mask or onto the table portion 11 in a state that the mask provided with the holes opened so as to correspond with openings of at least a part of the cells 3 is disposed on an end face 8 of the honeycomb structure 1; and a pressurizing means having a pressurizing face 24*s* disposed at an acute angle with respect to a surface of the mask and pressurizing the plugging material 31 and having a moving means which moves on the table portion 11.

Then, after the plugging material 31 is supplied on the mask of the honeycomb structure 1 positioned with respect to the table portion 11 or on the table portion 11, the pressurizing means moves on the table portion 11, thereby pressurizing the plugging material 11 supplied on the mask by the pressurizing face 24*s* to fill the plugging material 31 into cells 3 of the honeycomb structure 1.

The pressurizing means has a pressurizing mechanism for moving the pressurizing face 24*s* in a direction perpendicular to the surface of the mask and a driving mechanism for moving the pressurizing face 24*s* along the surface of the mask (film 25). Specifically, the pressurizing means is provided with a plugging apparatus 24, and the plugging apparatus moves vertically and horizontally to fill the plugging material 31 into the cells 3 under pressure.

The plugging material supply apparatus 23 may be constituted separately from the plugging apparatus 24 as shown in FIG. 2. However, it is arranged in the plugging apparatus 24, which is a pressurizing means, as shown in FIG. 11 and can be constituted so as to move unitarily with the pressurizing means.

As shown in FIG. 2, in the case that the pressurizing face 24*s* is constituted as a flat face, it is preferable to constitute the pressurizing face 24*s* in such a manner that the pressurizing face 24*s* forms an acute angle, more specifically, 2° or more and 55° or less, more preferably 10° or more and 55° or less with respect to the surface of the mask (film 25). Such a constitution enables to pressurize and fill the plugging material 31 into the cells. Though the plugging depth can be changed by changing the angle of the pressurizing face 24*s*, fluctuations of the plugging depth increase when the angle is more than 55°.

Figure 11:
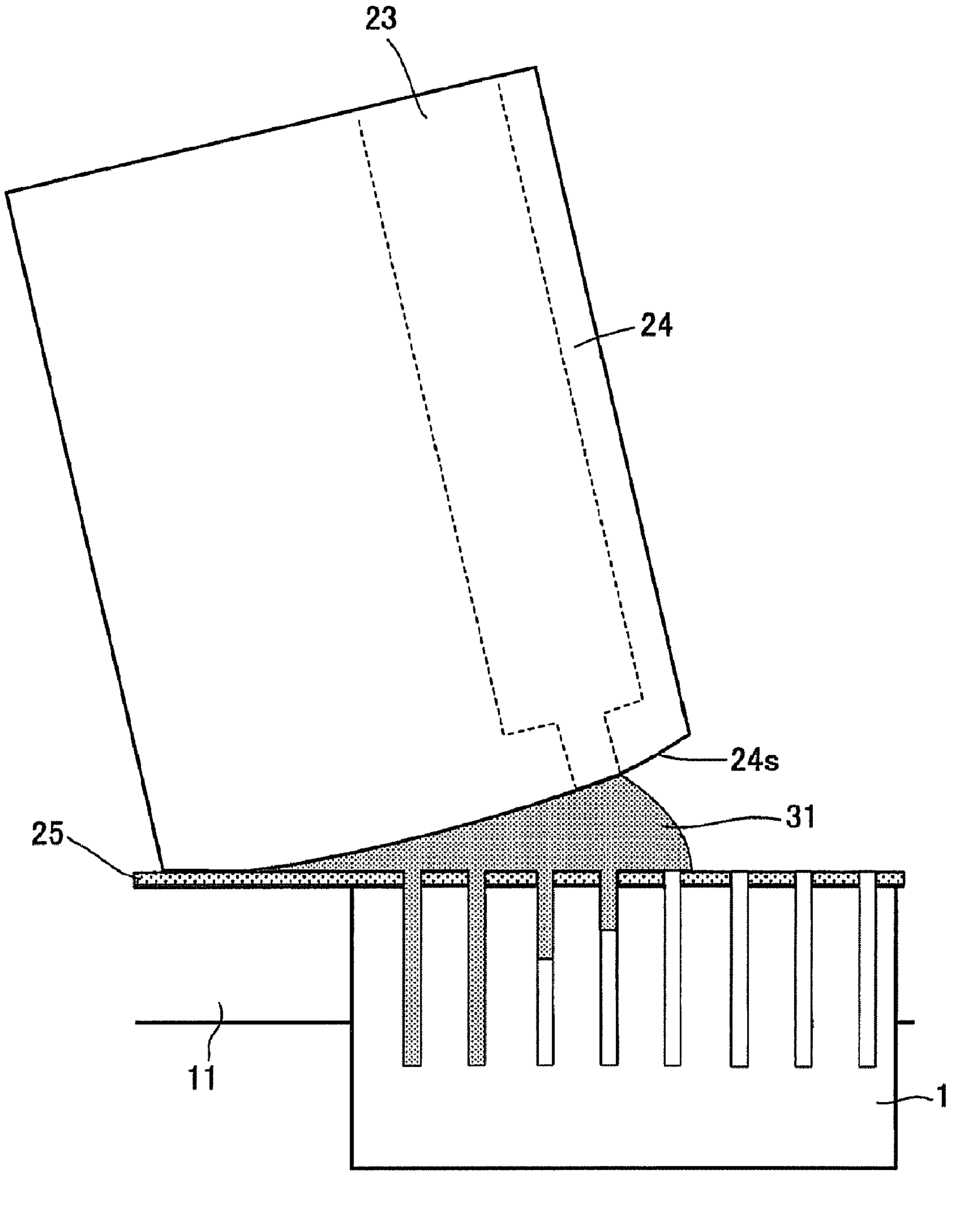
FIG. 11 is a diagram showing another embodiment of a plugging apparatus.

Alternatively, the pressurizing face 24*s* can be constituted as a curved face having a protruding shape toward the mask side as shown in FIG. 11. Such a constitution makes pressurizing and filling of the plugging material 31 into the cells 3 easy.

Figure 4:
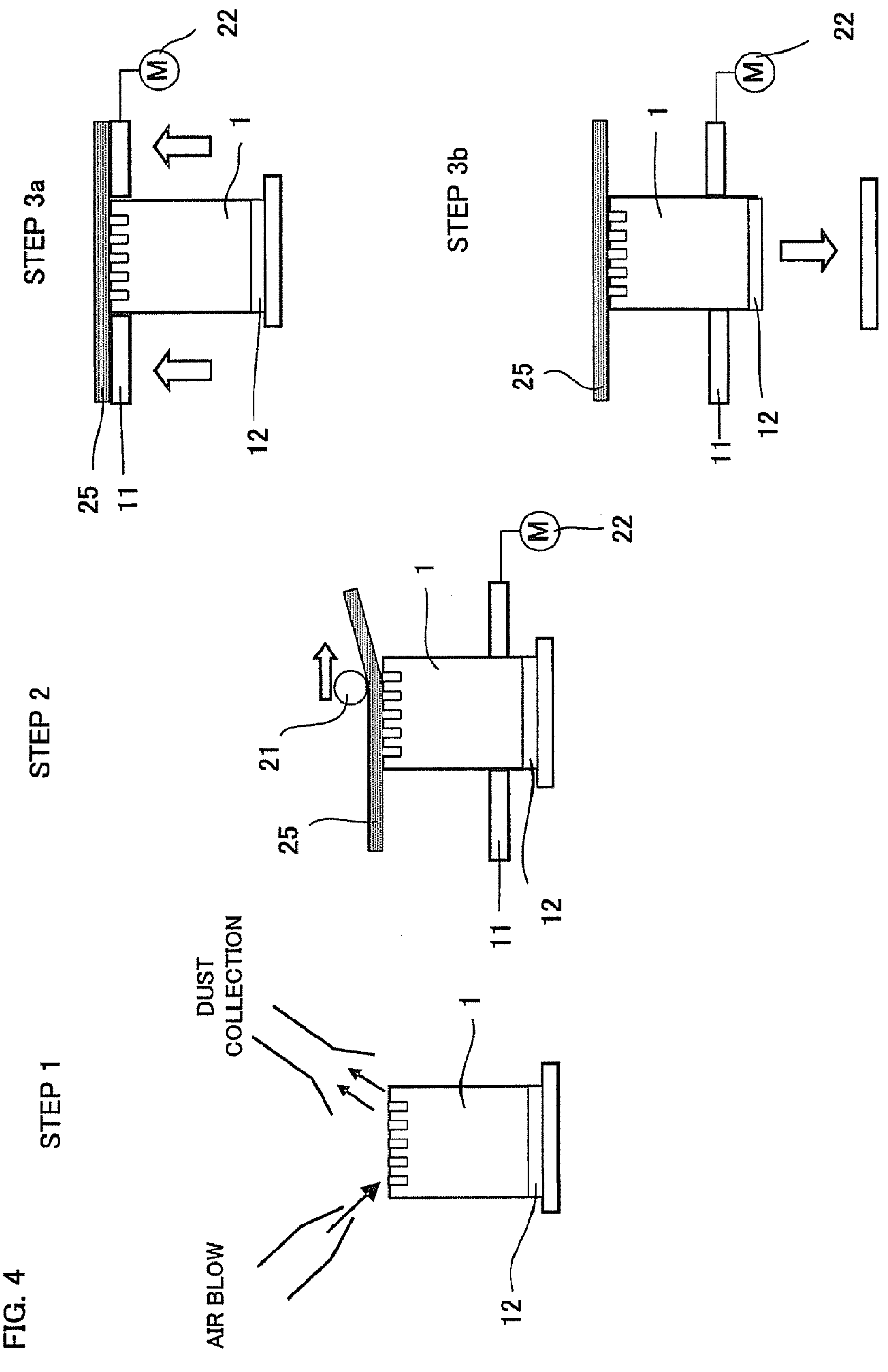
FIG. 4 is a diagram showing a plugging step of Embodiment 1.

In more detail, the manufacturing apparatus for a honeycomb structure 1 having plugging portions includes a roller 21 as the film-attaching means, and the film 25 can be attached to the table portion 11 and the end face 8 of the honeycomb structure 1 by the use of the roller 21 (see FIG. 4). Moreover, as the positioning means for positioning the table portion 11 and the honeycomb structure 1, a motor 22 is connected to the table portion 11 to lift up and down the table portion 11. Alternatively, the motor 22 is connected to a support base 12 to lift up and down the support base 12 on which the honeycomb structure 1 is mounted. The apparatus includes a laser 16 as the hole making means for making the holes in the film 25 (see FIG. 5).

First, as shown in the step 1 of FIG. 4, dust adhering to the end face 8 of the honeycomb structure 1 having porous partition walls 2 and a plurality of cells 3 extended from one end face 8 to the other end face 8 and separated and formed by the partition walls 2 is blown away by air blow, and the dust is collected to clean the end face 8.

Then, as shown in the step 2 of FIG. 4, a film 25 is attached to the end face 8 of the honeycomb structure 1 in a state that the side face portion is of the honeycomb structure 1 is not covered in a state that a part of the honeycomb structure 1 is inserted into the through-hole 11*h* of the table portion 11. At this time, specifically, the film 25 may be pressurized by a roller 21 or the like to bring the film 25 into close contact with the end face 8.

Next, as shown in the step 3*a* of FIG. 4, the table portion 11 is raised by a motor 22 in a state that the honeycomb structure 1 having the film 25 attached thereto is inserted into a through-hole 11*h*. The table portion 11 and the honeycomb structure 1 are positioned and held in order to attach the remaining portion of the film 25 in such a manner that the film 25 becomes flat.

Figure 3A:
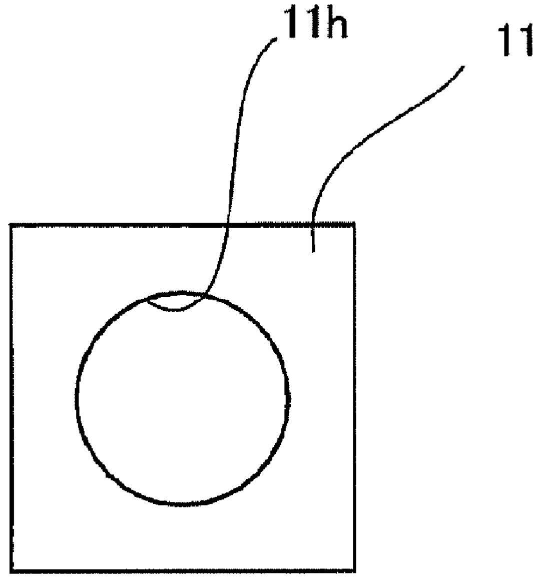
FIG. 3A is a diagram showing a through-hole in a table portion.
Figure 3B:
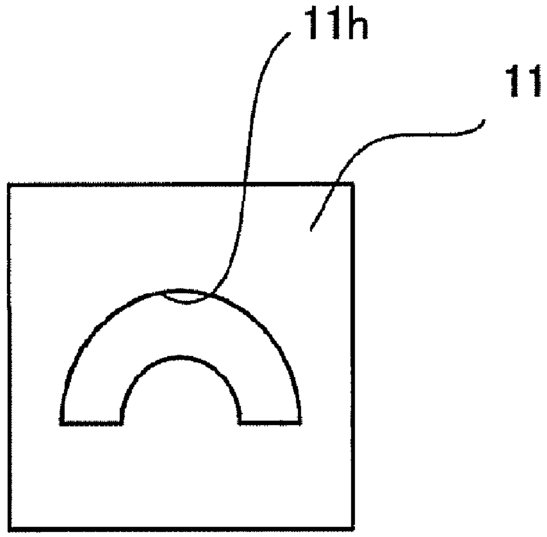
FIG. 3B is a diagram showing another embodiment of a through-hole in a table portion.

FIGS. 3A and 3B show a plan view of the table portion 11. As described above, by covering the table portion 11 and the honeycomb structure 1 with the same film 25, a mask can be applied without problem even on the honeycomb structure 1 having a shape suitable for the shape of the through-hole 11*h* as shown in FIG. 3B, not to mention the cylindrical honeycomb structure 1 suitable for the shape of the through-hole 11*h* as shown in FIG. 3A. As shown in FIG. 2, by covering the table portion 11 and the honeycomb structure 1 with the same film 25 in a flat state, a rumple is hardly caused in the film 25, and difficulty is hardly caused in image processing during a hole-forming step.

Alternatively, as shown in the step 3*b* of FIG. 4, there may be employed a constitution where the support base 12 on which the honeycomb structure 1 is mounted is lowered so that the film 25 attached to the end face 8 can be attached in a flat state also to the table portion 11.

Subsequently, as shown in the step 4 of FIG. 5, the end face 8 of the honeycomb structure 1 is photographed with an image pickup apparatus 15 to acquire image data capable of specifying the shapes and positions of the cells 3 to be plugged and the cells 3 which are not to be plugged. There is no special restriction on the image pickup apparatus 15 for photographing the end face 8 of the honeycomb structure 1. However, for example, a charge-coupled apparatus (CCD) camera, an X-ray computed tomography (CT) scanner or the like may preferably be used.

Subsequently, as shown in the step 5 of FIG. 5, based on the image data acquired in the previous step, the holes opened so as to correspond with the openings of at least a part of the cells 3 are formed in the film 25 by the use of the laser 16 to form a mask. Therefore, the image pickup apparatus 15 and the laser 16 constitute the hole making means.

Figure 5:
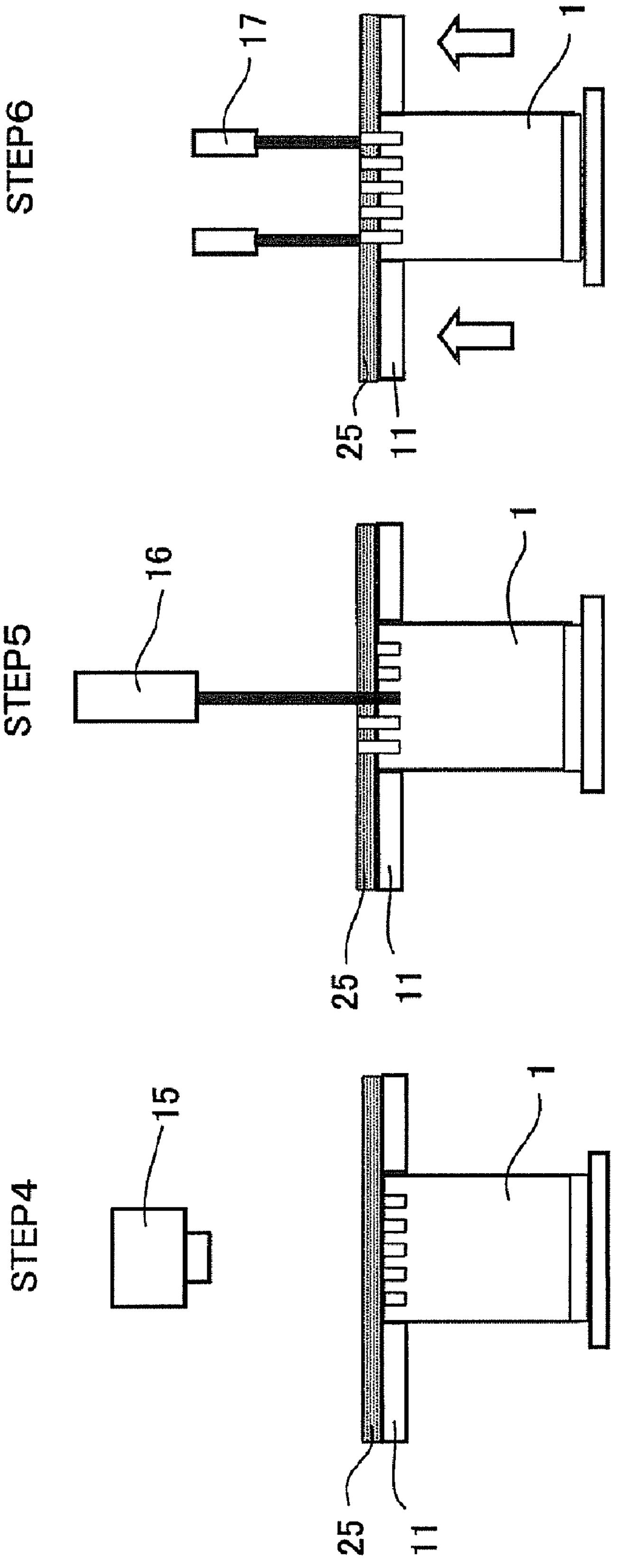
FIG. 5 is a diagram showing the plugging step of Embodiment 1, subsequent to FIG. 4.

Then, as shown in the step 6 of FIG. 5, the honeycomb structure 1 is positioned in a predetermined position by the use of a sensor 17 (e.g., an infrared sensor) so that the flat upper surface of the table portion 11 is on the same plane as the end face 8 of the honeycomb structure 1.

Subsequently, as shown in the step 7 of FIG. 6, the plugging material 31 (a slurry) having fluidity is supplied onto the mask (the film 25) provided with the holes or onto the table portion 11 by the use of a plugging material supply apparatus 23 as the plugging material supply means. Examples of the plugging material 31 for use in plugging the cells include a mixture obtained by mixing a ceramic powder, a bonding agent and a deflocculant and water added as a dispersion medium thereto. Specifically, the material is preferably a ceramic selected from the group consisting of cordierite, mullite, alumina, silicon carbide, and a combination thereof.

Figure 6:
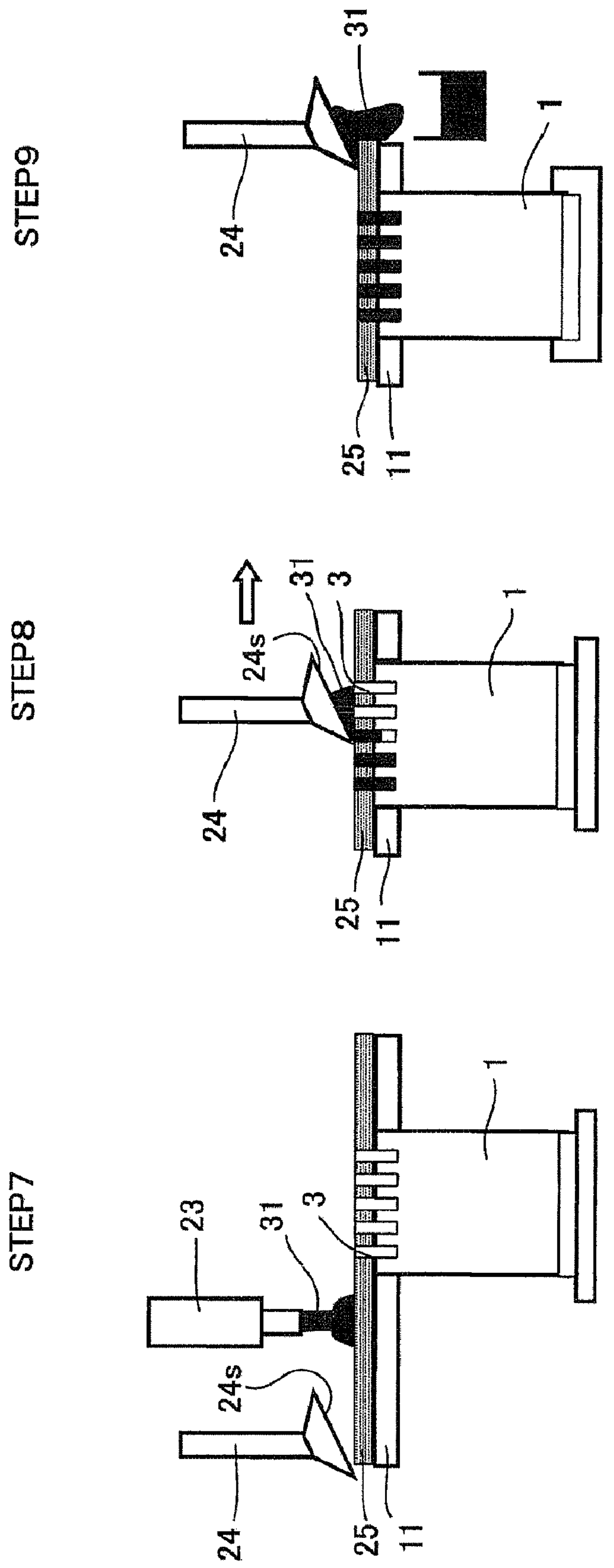
FIG. 6 is a diagram showing the plugging step of Embodiment 1, subsequent to FIG. 5.

Then, as shown in the step 8 of FIG. 6, by a plugging apparatus 24 as a pressurizing member, the plugging material 31 supplied onto the mask or the table portion 11 is filled into the cells 3. Specifically, the plugging apparatus 24 has a pressurizing face 24*s* which is arranged at an acute angle with respect to the surface of the mask to pressurize the plugging material 31 and moving means which moves along the table portion 11. After supplying the plugging material 31 onto the mask of the honeycomb structure 1 positioned with respect to the table portion 11 or onto the table portion 11, the plugging apparatus 24 moves along the table portion 11, whereby the plugging material 31 supplied onto the mask is pressurized by the pressurizing face 24*s* to fill the plugging material 31 into the cells 3 of the honeycomb structure 1. At this time, as described above, it is preferable that a part of a region of the pressurizing face 24*s* is moved on the mask in a state that the region is brought into surface contact with the mask via the plugging material 31 to pressurize the plugging material 31 to the cell side, to push out the extra plugging material 31 in the moving direction, and to further pressurize and fill the material into the cells with forming the region of the surface contact. By the surface contact of a part of the region of the pressurizing face 24*s* with the mask, the plugging material 31 can securely be filled into the cells. On the other hand, if the material is not pressurized, it is difficult to fill the plugging material 31 at a certain amount or more into the cells to cause insufficient plugging.

Figure 8:
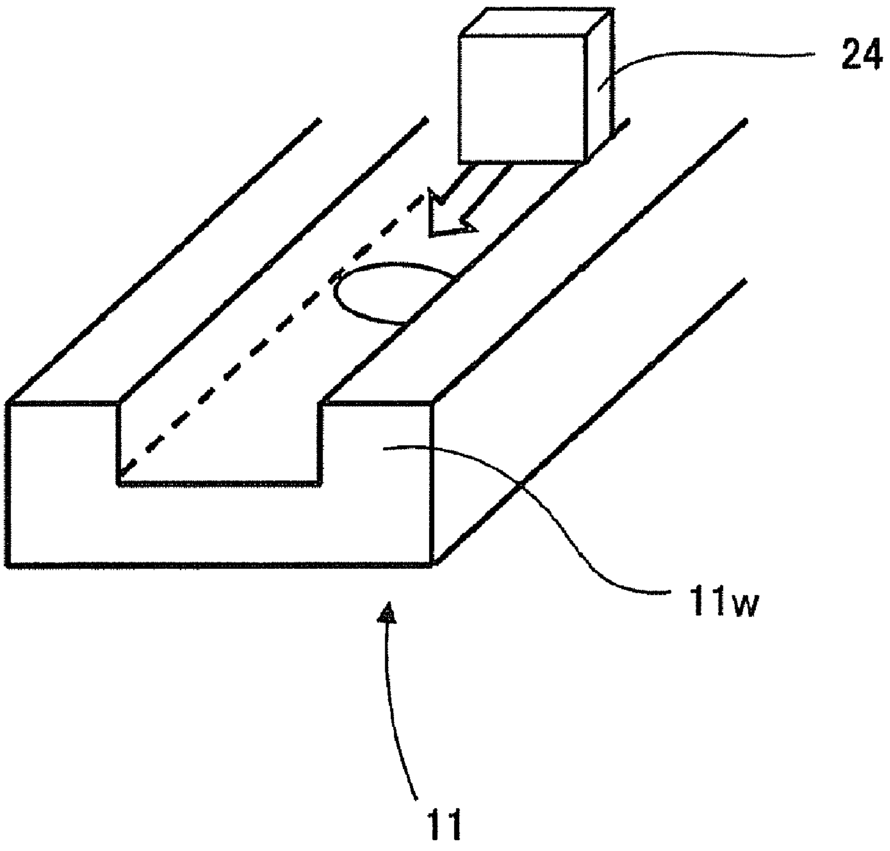
FIG. 8 is a diagram showing the side wall portion of the table portion.

As shown in FIG. 8, it may be constituted that the table portion 11 has side wall portions 11*w* protruding from the surface of the table portion and formed in parallel on opposite sides of the through-hole 11*h* on the surface of the table portion. By such a constitution, the plugging material 31 can be prevented from leaking from the surface of the table portion 11.

Further, after filling the plugging material 31 into the cells 3, as shown in the step 9 of FIG. 6, the plugging apparatus 24 is moved off the table portion 11 to remove the extra plugging material 31 from the table portion 11.

Figure 9:
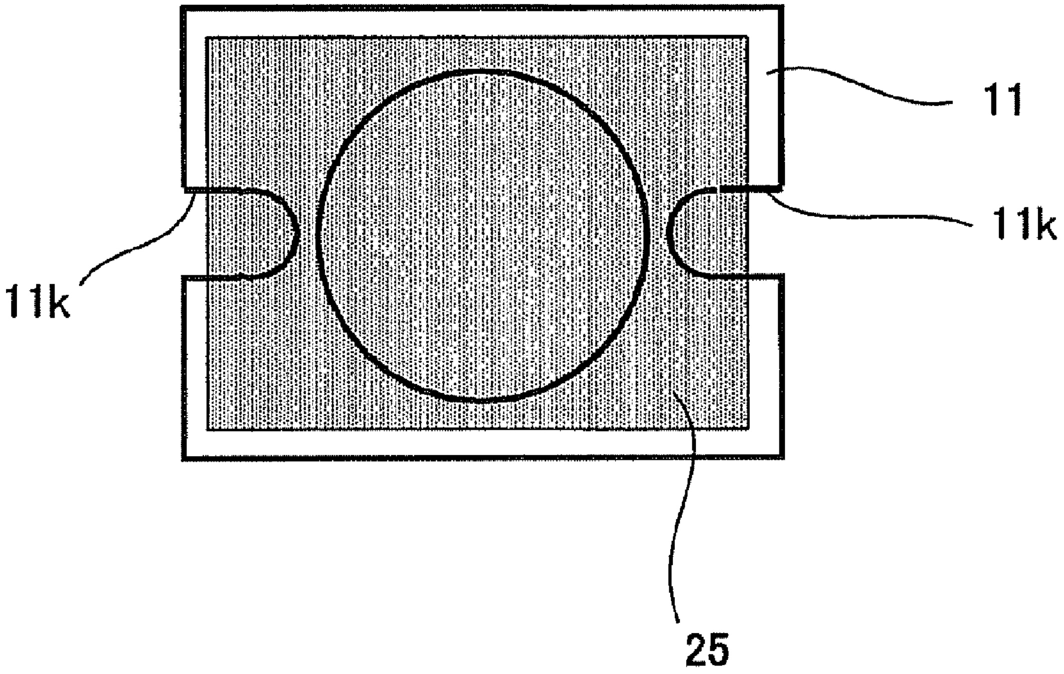
FIG. 9 is a diagram showing a notch portion in the table portion.

Subsequently, as shown in the step 10 of FIG. 7, the table portion 11 is lowered by the moving means to peel the film 25 from the table portion 11. Then, as shown in the step 11 of FIG. 7, the mask attached to the end face 8 is peeled by a peeling apparatus 27. As shown in FIG. 9, when notch portions 11*k* are formed in both the ends of the table portion 11, the film can be peeled without lowering the table portion 11.

Figure 7:
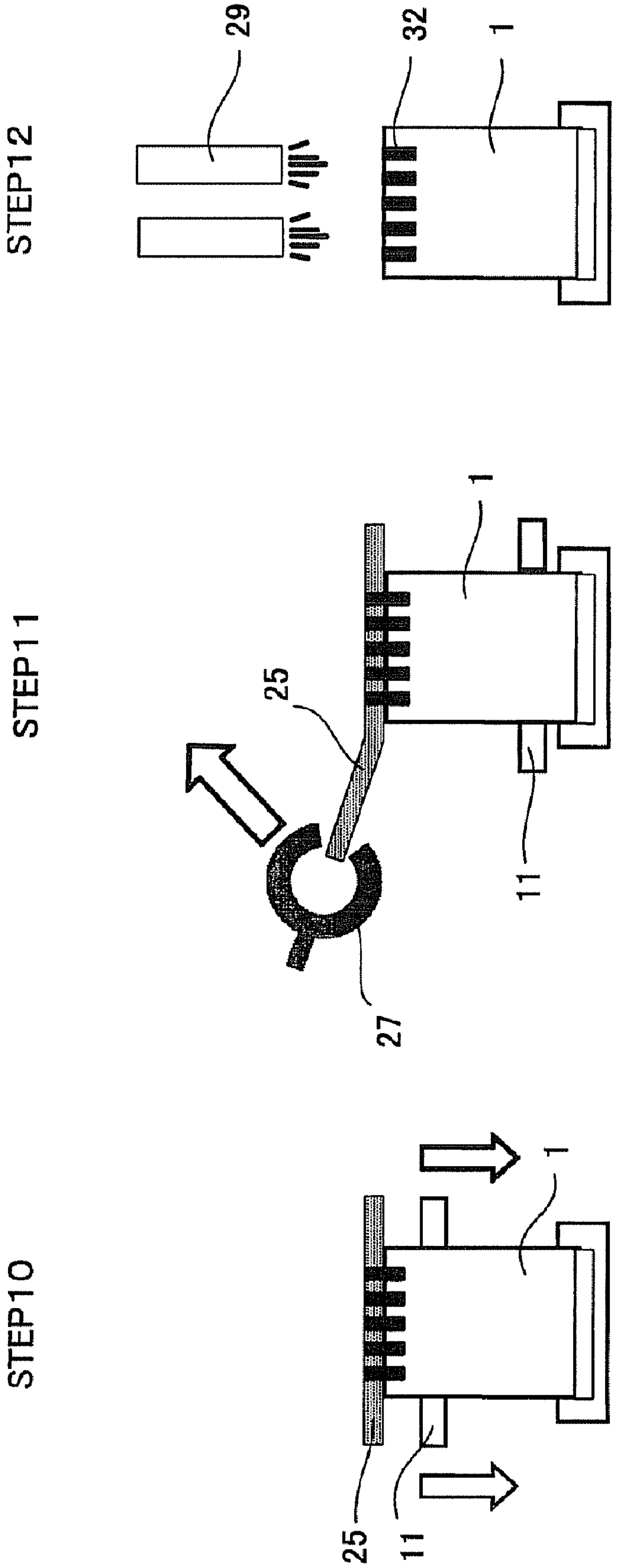
FIG. 7 is a diagram showing the plugging step of Embodiment 1, subsequent to FIG. 6.
Figure 21:
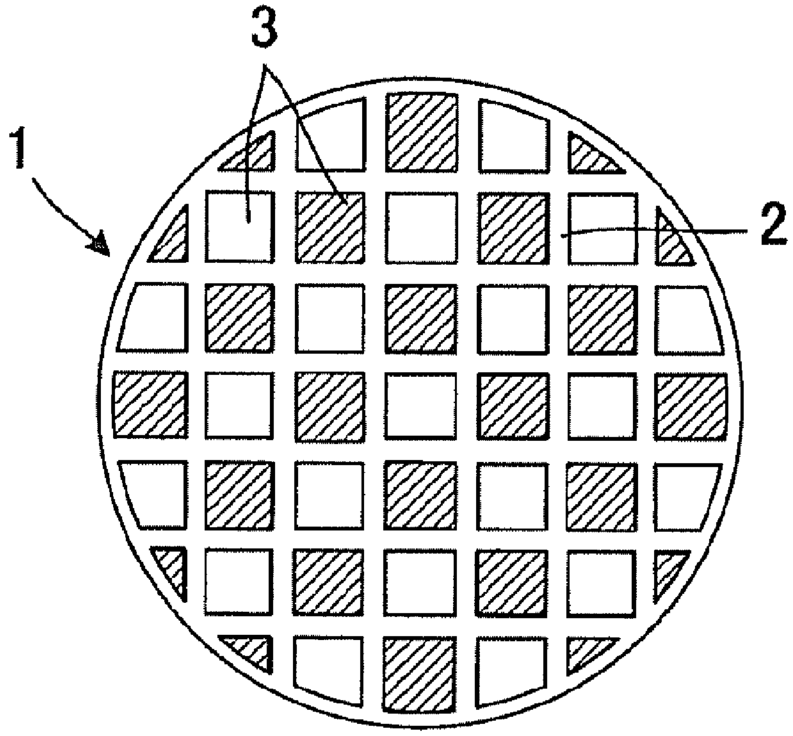
FIG. 21 is a diagram showing an end face of a honeycomb structure having a plugged portion formed therein.
Figure 22:
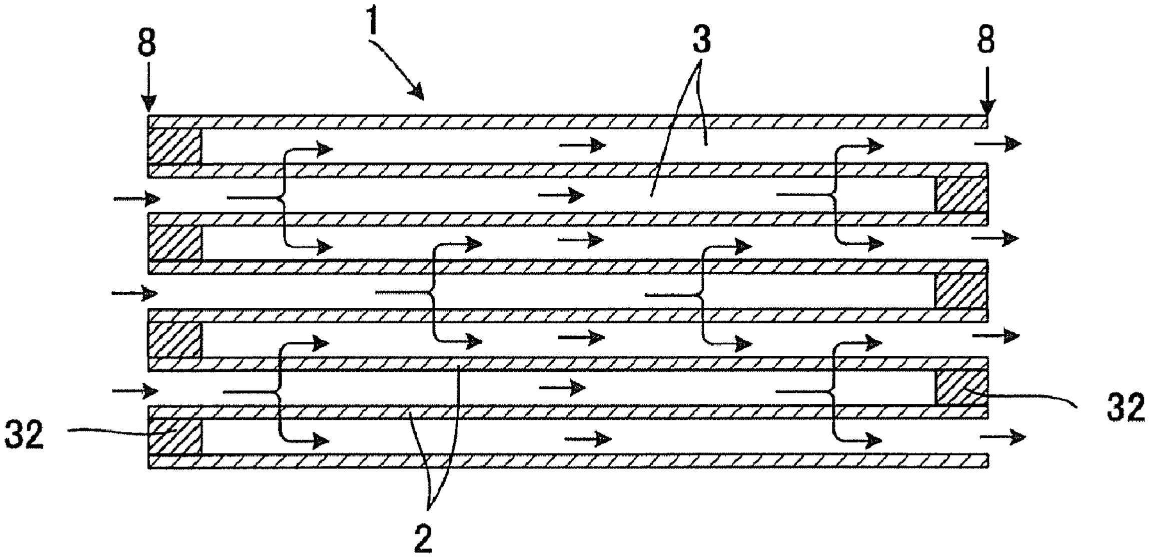
FIG. 22 is a cross-sectional view of a cross section cut along an axial direction.

As shown in the step 12 of FIG. 7, the honeycomb structure 1 is dried by a drying apparatus 29 as the drying means, whereby the honeycomb structure 1 provided with plugging portions 32 is completed. FIG. 21 shows an end face of a honeycomb structure 1 having plugging portions 32 formed therein. In addition, FIG. 22 shows a cross-sectional view of a cross section cut along the axial direction. By the formation of the plugging members 32, the exhaust gas flowing into the structure from the inlet port passes through the partition walls 2 and discharged from the outlet port. When the exhaust gas passes through the partition walls, particulate matter in the exhaust gas is trapped by the partition walls 2 to purify the exhaust gas.

Embodiment 2

Another plugging method will be described with reference to FIG. 10. A manufacturing apparatus of a honeycomb structure 1 having a plugged portion according to Embodiment 2 for use in the plugging method of the present invention includes a table portion 11 having a through-hole 11*h* into which the end face portion of the honeycomb structure 1 is to be inserted; a film attaching means for attaching a film 25 on the surface side of the table portion 11; a positioning means for positioning and holding the table portion 11 and the honeycomb structure 1 so as to attach the film 25 to the end face 8 of the honeycomb structure in a state where the end face portion of the honeycomb structure 1 is inserted into the through-hole 11*h* of the table portion 11 provided with the film 25 attached to the surface side including a region of the through-hole 11*h* and where a side surface portion 1*s* of the honeycomb structure 1 is not covered; a hole making means for forming, in the film 25 attached to the end face 8 of the honeycomb structure 1, holes opened so as to correspond with the openings of at least a part of the cells 3, thereby forming a mask; a plugging material supply means for supplying a plugging material 31 having fluidity onto the mask provided with the holes or onto the table portion 11; and a pressurizing means for filling the plugging material 31 supplied onto the mask or the table portion 11 into the cells 3.

Figure 10:
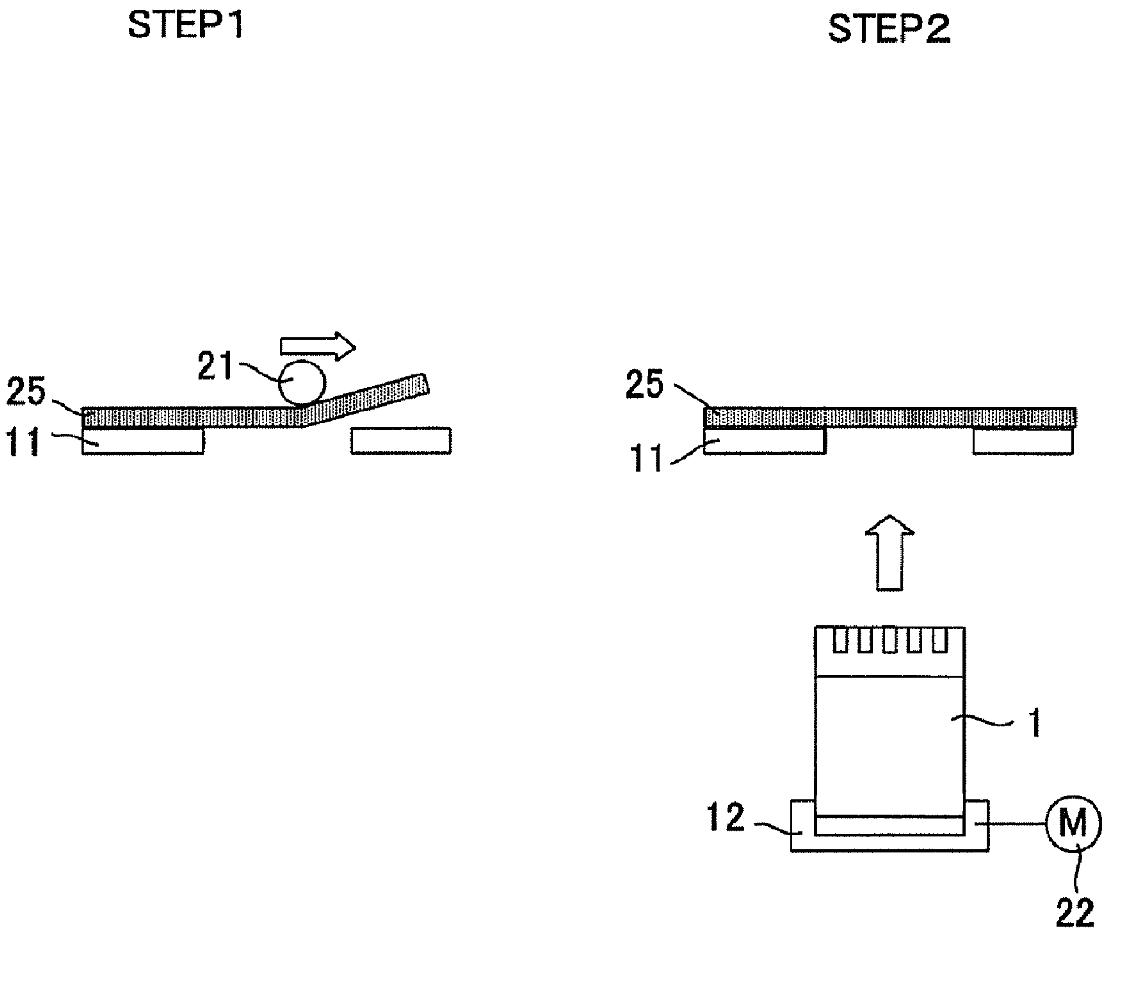
FIG. 10 is a diagram showing a plugging step of Embodiment 2.

As shown in the step 1 of FIG. 10, the film 25 is attached to the upside of the table portion 11 by the film attaching means. At this time, specifically, the film 25 may be pressed with a roller 21 or the like, and brought into close contact with the surface of the table portion 11.

After attaching the film 25 to the region of the surface of the table portion 11 including the through-hole 11*h*, as shown in the step 2 of FIG. 10, a support base 12 is lifted by a motor 22, whereby the end face portion of the honeycomb structure 1 is inserted into the through-hole 11*h*, and the film 25 is attached to the end face 8 of the honeycomb structure 1. That is, in a state where the honeycomb structure 1 is inserted into the through-hole 11*h* of the table portion 11 to which the film 25 is attached, the honeycomb structure 1 is positioned and held with respect to the table portion 11 by the motor 22 as the positioning means so as to attach the remaining portion of the film to the honeycomb structure 1 so that the film 25 attached to the end face 8 is in a flat state.

Then, in the same manner as in Embodiment 1, the end face 8 of the honeycomb structure 1 is photographed to acquire image data, and the holes are formed in the film 25 by a laser 16 to form a mask.

Subsequently, the plugging material 31 is supplied by a plugging material supply apparatus 23 to fill the plugging material 31 into the cells 3 by a plugging apparatus 24. That is, the plugging apparatus 24 moves along the table portion 11, whereby the plugging material 31 supplied onto the mask is pressurized by a pressurizing face 24*s* to fill the cells 3 of the honeycomb structure 1 with the plugging material 31. Then, the slurry of the plugging material 31 is removed from the table portion 11.

Then, the table portion 11 is lowered to peel the film 25 from the table portion 11. The honeycomb structure 1 which has been plugged is dried to complete the honeycomb structure having a plugged portion.

Embodiment 3

Figure 14:
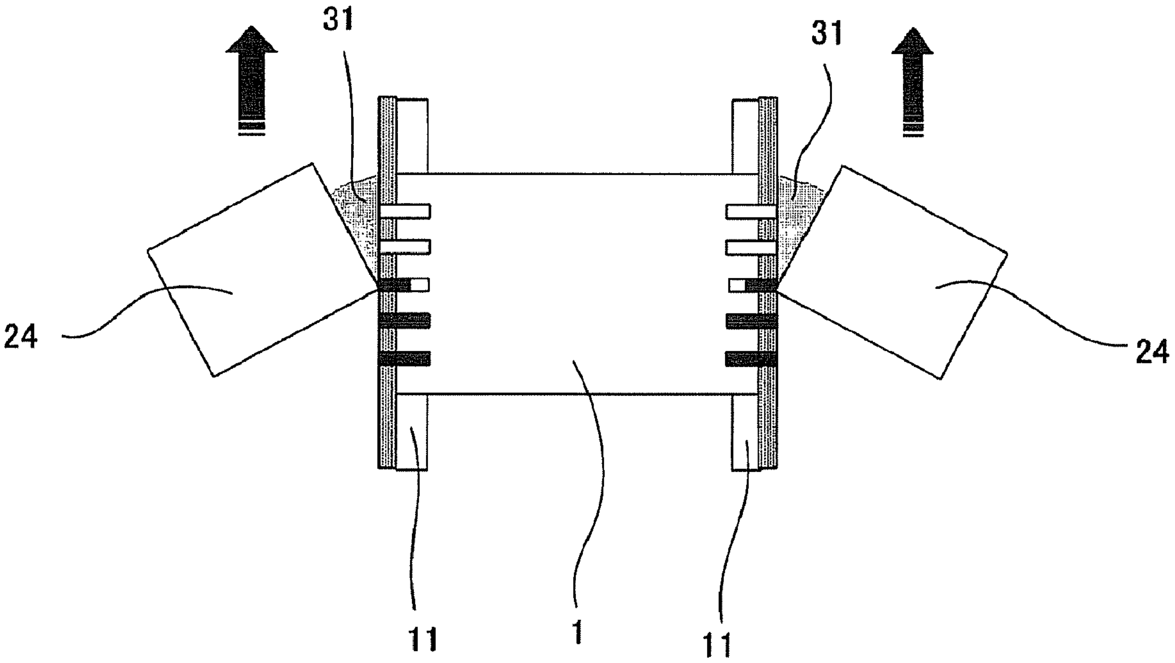
FIG. 14 is a diagram showing Embodiment 3, where both the end faces of the honeycomb structure is plugged simultaneously.

FIG. 14 shows an embodiment 3, where both the end faces 8 are plugged simultaneously. As shown in FIG. 14, the honeycomb structure 1 is disposed horizontally in such a manner that the axial direction (height direction) of the honeycomb structure 1 becomes almost horizontal, the plugging material 31 having fluidity is supplied on the mask or on the table portion 11, and the plugging apparatus 24 is moved from above to the downward to fill the plugging material 31 into the cells 3. Such a constitution enables to plug both the end faces 8 simultaneously to halve the time for plugging.

Figure 13:
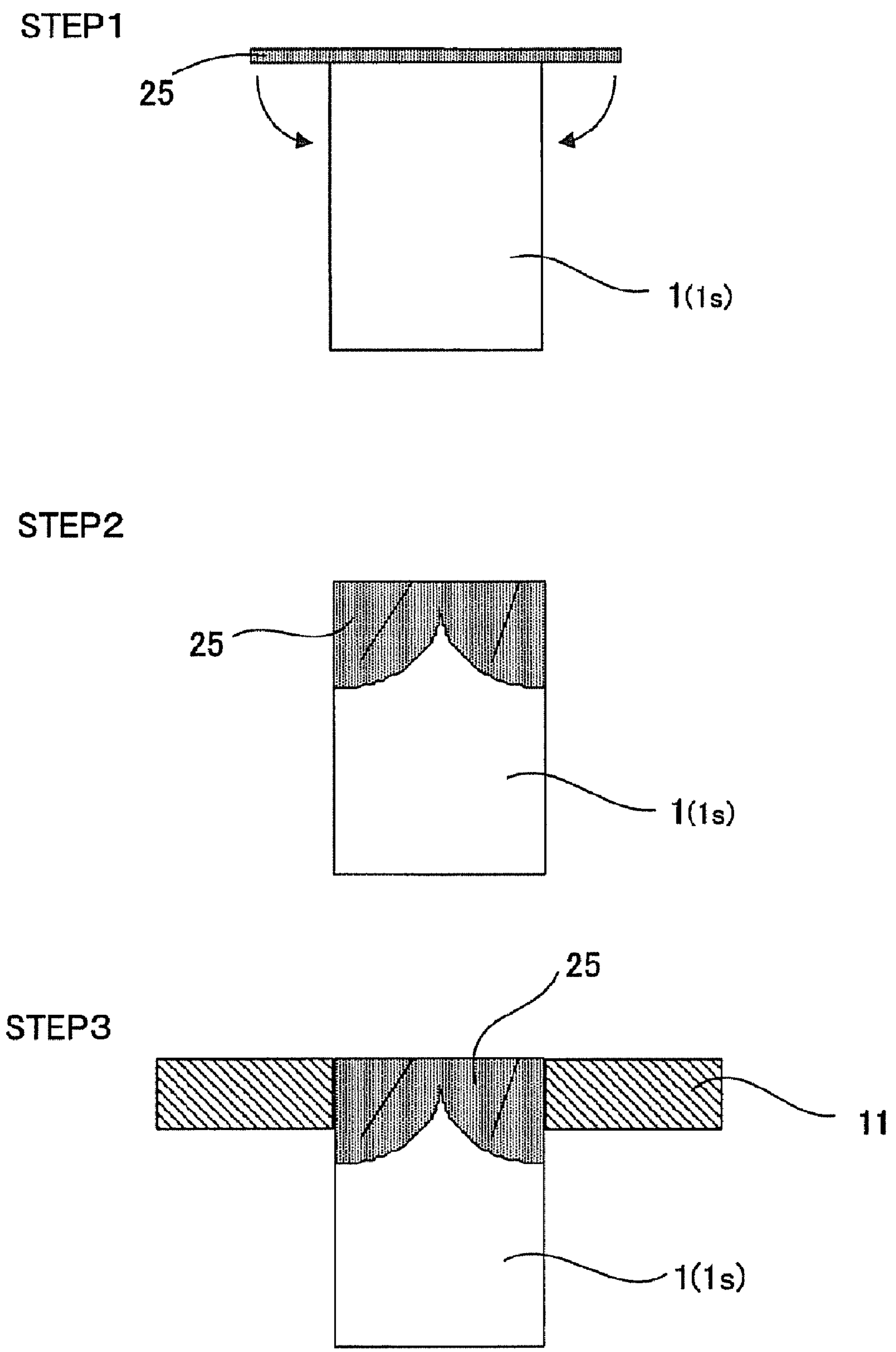
FIG. 13 is a diagram showing another embodiment of film application.

In the above, an embodiment where the film 25 is attached to the end faces 8 of the honeycomb structure 1 and the table portion 11 in a flat state. However, the film 25 may be attached only to the end faces 8 of the honeycomb structure 1 as shown in FIG. 13. That is, as shown in the step 1 of FIG. 13, in the first place, the film 25 is attached to the end faces 8 of the honeycomb structure 1, and the film 25 is folded as shown in the step 2 of FIG. 13 to attach at least a part of the film 25 to the side face portion is of the honeycomb structure 1. Then, as shown in the step 3 of FIG. 13, the honeycomb structure 1 and the table portion 11 are positioned in such a manner that an end face 8 of the honeycomb structure 1 is in the same level as the surface of the table portion 11. Then, in the same manner as described above, the hole-making step and the plugging step are conducted.

Embodiment 4

Next, an embodiment using a manufacturing apparatus of a honeycomb structure 1 having a sealing mechanism. The sealing mechanism has a sealing member 35 for sealing the gap between the side face portion is of the honeycomb structure 1 and the table portion 11 with holding the end portion on the end face 8 side of the side face portion is of the honeycomb structure 1 where a mask is provided on the end face 8 in the state that the remaining portion of the mask is folded toward the side face portion 1*s* and that at least a part of the mask is adhered to the side face portion. The sealing member 35 is a hollow elastic ring, and sealing is performed by expanding the elastic ring by air pressure. Alternatively, the elastic ring may be expanded using liquid.

As a tube material of the elastic ring, rubber may be used, and elastomer may also be used. An elastic ring having, for example, an inner diameter of 50 mm to 400 mm, an outer diameter of 75 mm to 425 mm, a thickness of 10 mm and 40 mm may be used.

Figure 15:
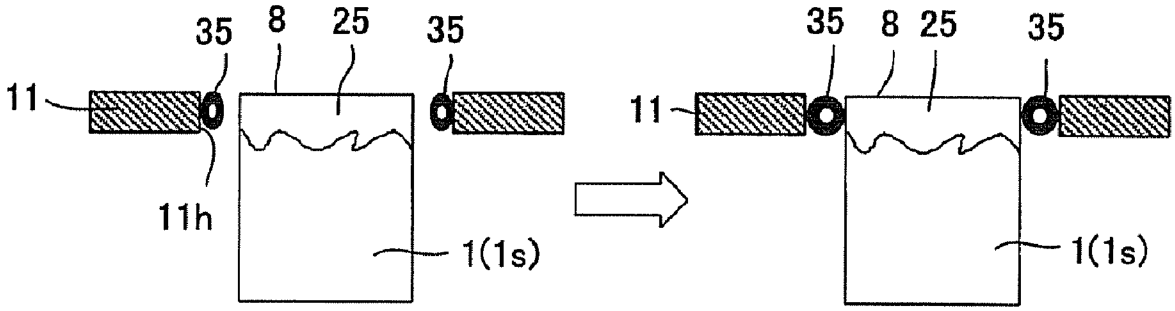
FIG. 15 is a diagram showing Embodiment 4, which uses a manufacturing apparatus of a honeycomb structure having plugging portions provided with a sealing member.

As shown in FIG. 15, an end portion on the end face 8 side of the side face portion 1*s* of the honeycomb structure 1 where a mask or a film 25 serving as the mask is attached to the end face 8 thereof in the state that the remaining portion of the mask or the film 25 is folded toward the side face portion 1*s* and that at least a part is attached to the side face portion is inserted into the through-hole 11*h* of the table portion 11 to position the table portion 11 and the honeycomb structure 1. The sealing member 35 is constituted in such a manner that the contact portion with the side face portion 1*s* of the honeycomb structure 1 is movable. By expanding the sealing member 35 by air pressure, the gap between the side face portion 1*s* of the honeycomb structure 1 and the table portion 11 is sealed to inhibit the extra plugging material pushed out by the pressurizing face 24*s* from flowing into the through-hole 11*h* in the table portion 11. That is, the honeycomb structure 1 is inserted into the sealing member 35 in the state that the film 25 is folded, and, by expansion of the elastic ring of the sealing member 35 disposed on the appropriate position, the gap between the honeycomb structure 1 and the elastic ring is filled up, and the honeycomb structure 1 is fixed, thereby inhibiting leakage of the plugging material. This enables to use the plugging material and to reduce the fluctuations of depth.

In addition, it is desired to perform positioning in such a manner that the end face 8 of the honeycomb structure 1 and the upper surface of the elastic ring (sealing member 35) is on the same plane. Alternatively, the end face 8 of the honeycomb structure 1 may be higher by 0 to 1 mm than the upper surface of the elastic ring. When the end face 8 of the honeycomb structure 1 is lower than the upper surface of the elastic ring, it is not preferable because pressurization is insufficient. When the end face 8 of the honeycomb structure 1 is higher by 1 mm than the upper surface of the elastic ring, plugging can be performed because of the following capability of a squeegee and because the plugging material 31 can be pushed out in the direction of movement. However, in order to push out sufficient plugging material in order to reduce the fluctuations of the plugging depth to 0.3, it is preferable that the end face 8 of the honeycomb structure 1 is 0.5 mm or less higher than the upper surface of the elastic ring and that the end face 8 of the honeycomb structure 1 is 0 to 0.5 mm higher than the upper surface of the elastic ring.

As described above, by the expansion of the elastic sealing member 35, the gap with the honeycomb structure 1 is filled up to inhibit leakage of the plugging material to the lower face of the honeycomb structure 1. The force for holding the honeycomb structure 1 can be improved, and inclination and movement of the honeycomb structure 1 during pressurization can be inhibited. This enables uniform pressurization to reduce fluctuations of the plugging depth. Since the elastic ring follows the honeycomb structure 1, the honeycomb structure 1 may have an arbitrary shape. The pressure for expanding the elastic ring is preferably 1 to 5 atmospheres. When the pressure is low, adherence is bad, and it may cause leakage of the plugging material. When the pressure is high, the elastic ring excessively expands, and movement of the plugging material to the end face 8 of the honeycomb structure 1 may be hindered, or the honeycomb structure 1 may be damaged. In addition, even when the film is folded, a peeling operation can easily be performed because there is a portion not attached to the side face.

Figure 16:
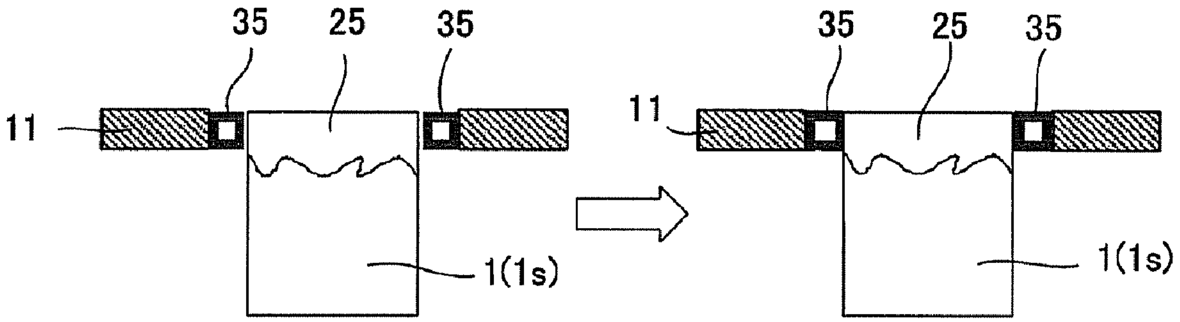
FIG. 16 is a diagram showing a modified example 1 of Embodiment 4.
Figure 17:
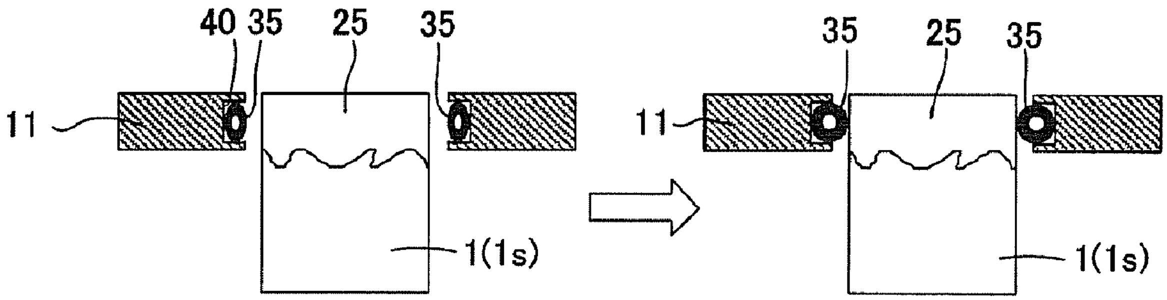
FIG. 17 is a diagram showing a modified example 2 of Embodiment 4.
Figure 18:
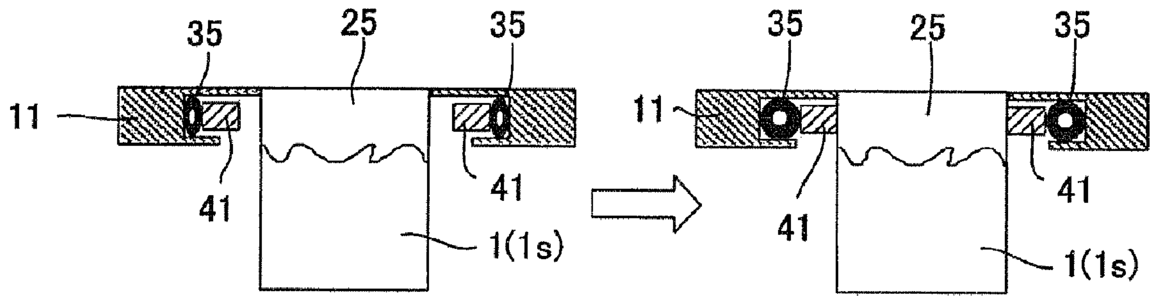
FIG. 18 is a diagram showing a modified example 3 of Embodiment 4.
Figure 19A:
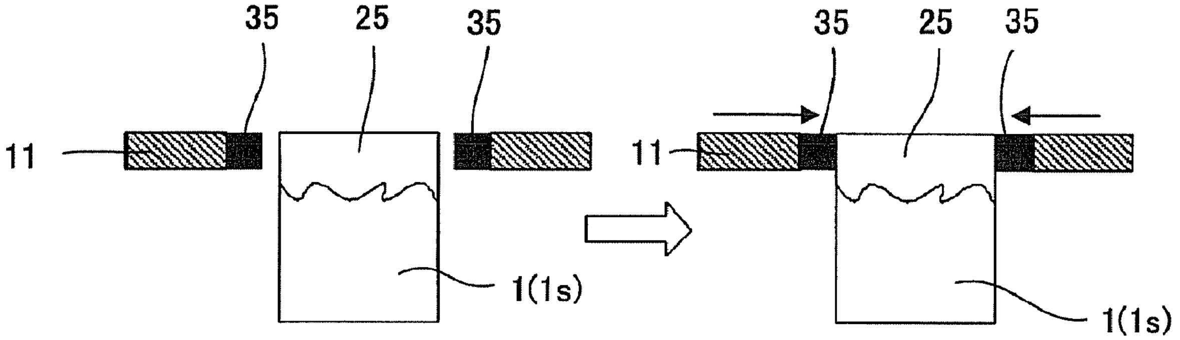
FIG. 19A is a diagram showing a modified example 4 of Embodiment 4.
Figure 19B:
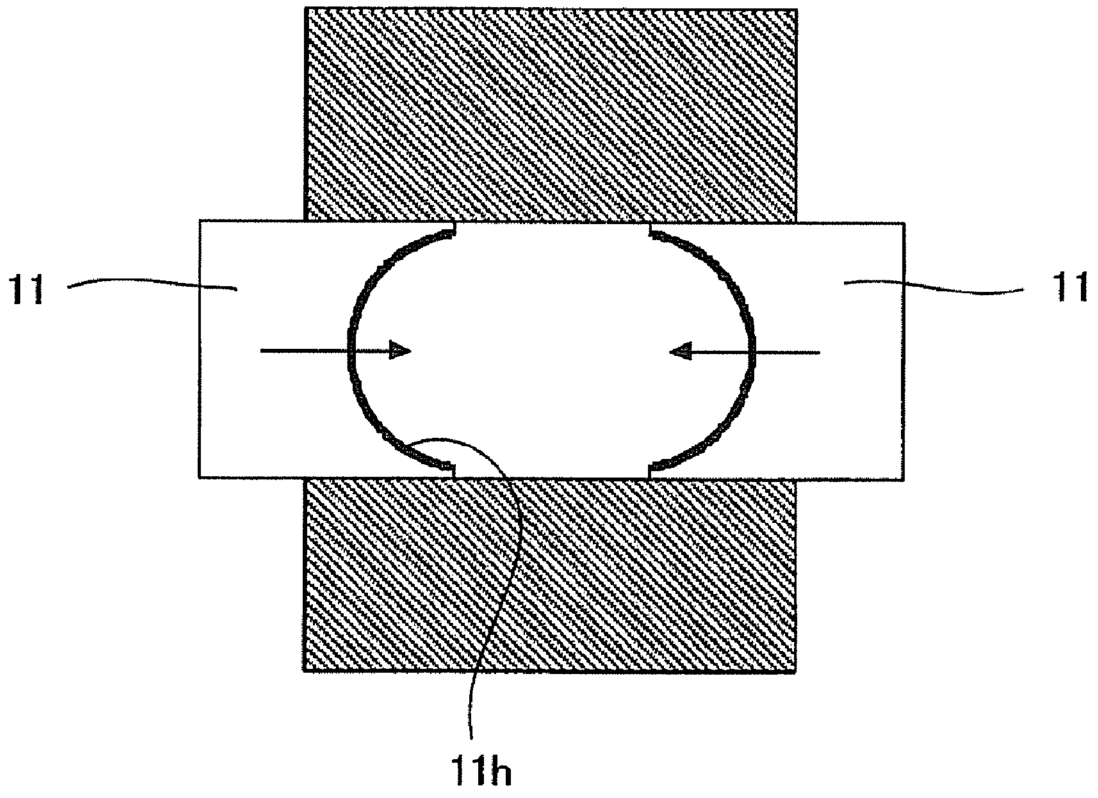
FIG. 19B is a diagram showing an overhead view of the table portion of the modified example 4.

The sealing member 35 may have a square cross section as the modified example 1 shown in FIG. 16. In addition, as the modified example 2 shown in FIG. 17, the sealing member 35 may be provided so as to engage with the groove-like depressed portion 40 formed on the inner peripheral face of the table portion 11. Alternatively, the honeycomb structure 1 may be fixed by providing the sealing member 35 in the groove-like depressed portion 40 on the inner peripheral face of the table portion 11 and a stopper member 41 for fixing the honeycomb structure 1 on the inner peripheral side thereof to press the stopper member 41 by the sealing member 35. Further, as the modified example 4 shown in FIGS. 19A and 19B, there may be employed a constitution where the table portion 11 can move, the sealing member 35 moves together with the table portion 11, and the sealing member 35 hold the honeycomb structure 1 for fixation. In this case, the sealing member 35 may be a solid elastic body and is not required to have a hollow tube-like shape because it is not required to expand itself.

Example 5

The embodiment 5 has two slant faces, which are the first pressurizing face and the second pressurizing face. The lower end of the first slant face and the lower end of the second slant face are joined with each other to form a joint portion, and a pressurizing means where the cross section is formed in a protruding shape by the first pressuring face and the second pressurizing face with the joint portion as the tip portion is used. By the movement of the pressurizing means in the forward direction on the table portion 11, the plugging material 31 is filled by the first pressurizing face, and, by the movement of the pressurizing means in the backward direction, the plugging material 31 is filled by the second pressurizing face.

Figure 26A:
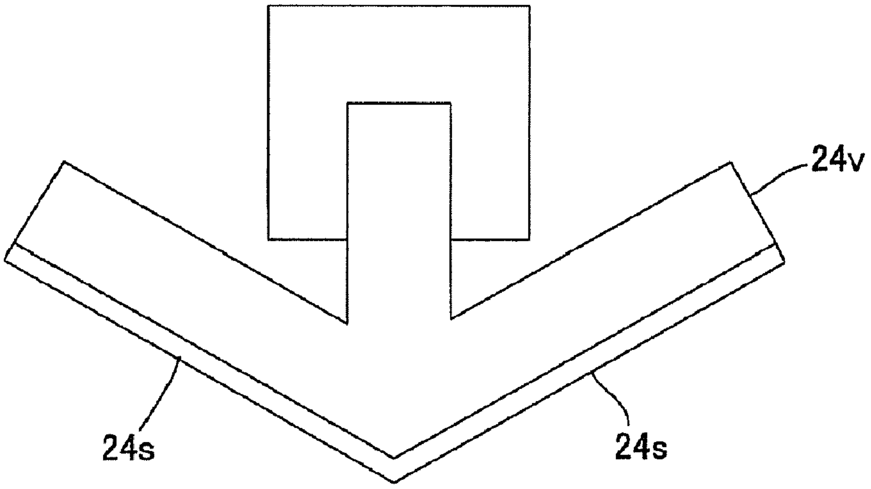
FIG. 26A is a diagram showing an embodiment of a V-shaped plugging apparatus.

As the pressurizing means, specifically, a V-shaped plugging apparatus 24*v* shown in FIG. 26A is used. The V-shaped plugging apparatus 24 shown in FIG. 26A has a squeegee where the two pressurizing faces 24*s* are disposed in a V shape to have an angle of 2° or more and 55° or less with respect to the surface of the mask. By using the V-shaped plugging apparatus 24*v*, reciprocating movement is possible, and the plugging material 31 can be filled thicker and precisely. In addition, by disposing the supply apparatus of the plugging material 31 of different paste, different kinds of plugging material 31 can be filled in multi layers in the continuous reciprocating movement. By using the above V-shaped plugging apparatus 24*v*, optimal depth and materials can be selected widely.

Figure 23:
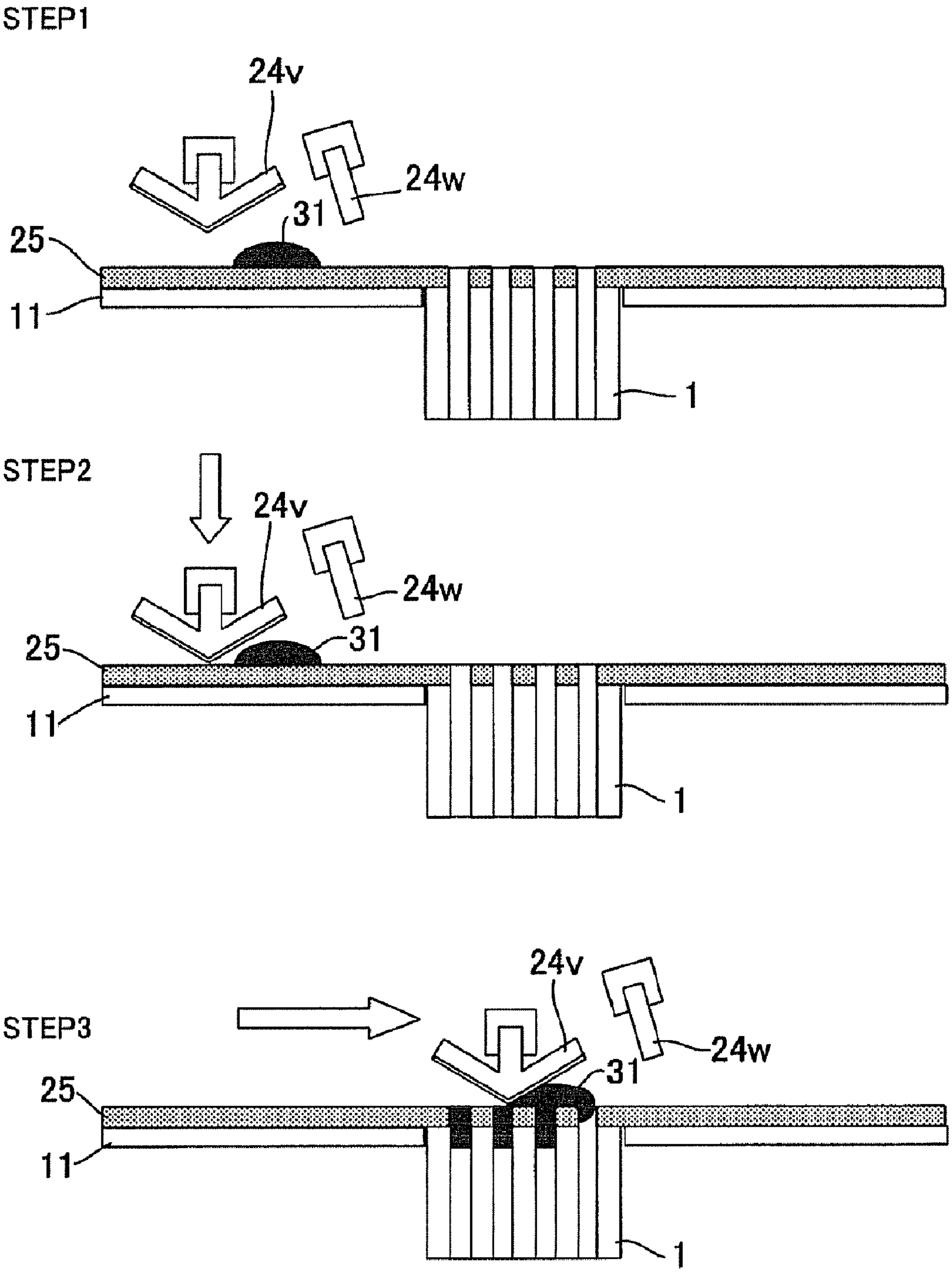
FIG. 23 is a diagram showing a plugging step of Embodiment 5.

Next, the plugging step of Embodiment 5 is described. As shown in the step 1 of FIG. 23, the plugging material 31 having fluidity (slurry or paste) is supplied on the mask (film 25) provided with holes and disposed on the end face 8 of the honeycomb structure 1 positioned with respect to the table portion 11. Then, as shown in the steps 2 and 3, with moving the V-shaped plugging apparatus 24*v* in the forward direction, the plugging material 31 supplied on the mask is pressurized by the first pressurizing face of the pressurizing face 24*s* of the V-shaped plugging apparatus 24*v* to fill the plugging material 31 into the cells 3 of the honeycomb structure 1.

Figure 24:
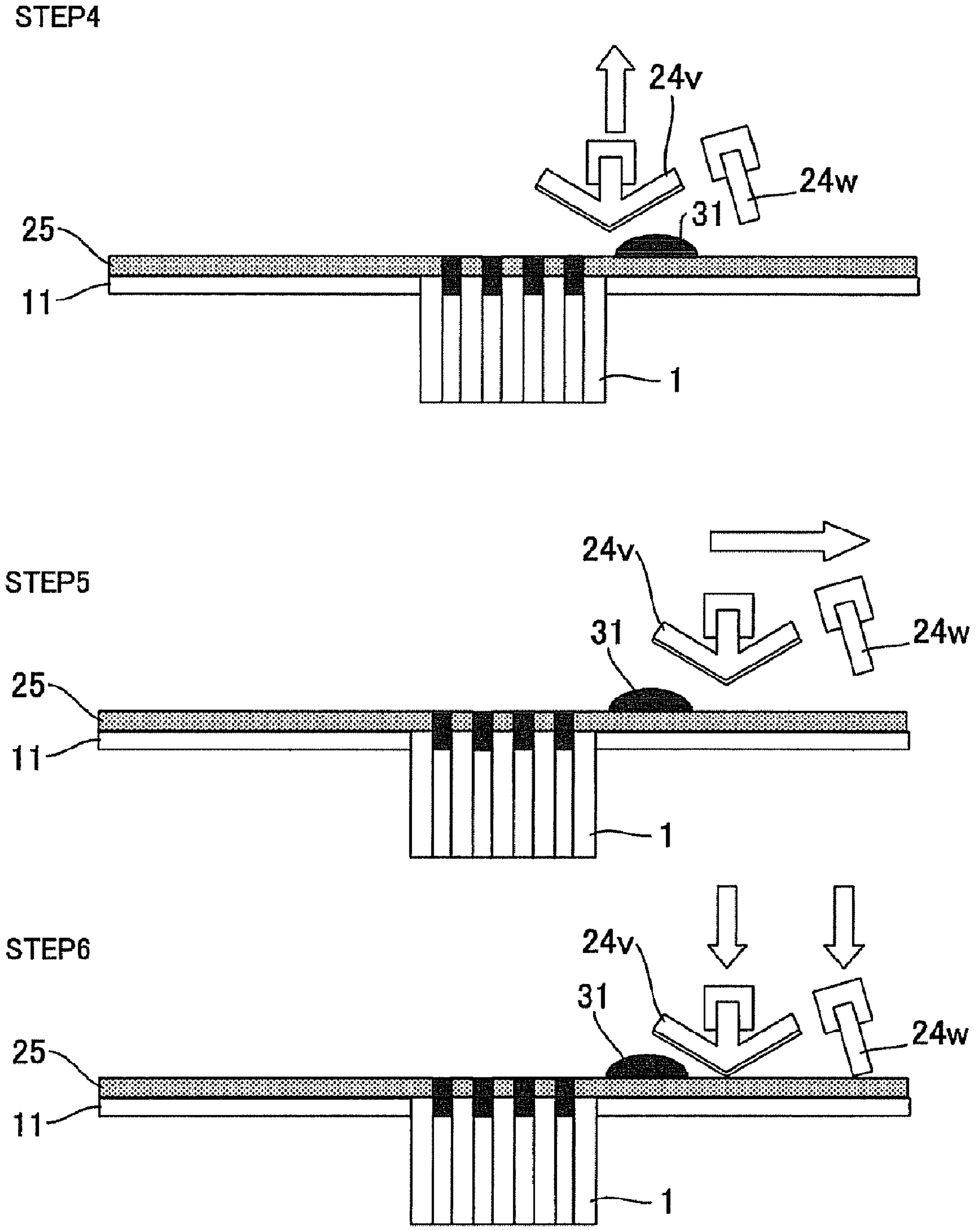
FIG. 24 is a diagram showing a plugging step following FIG. 23 of Embodiment 5.
Figure 25:
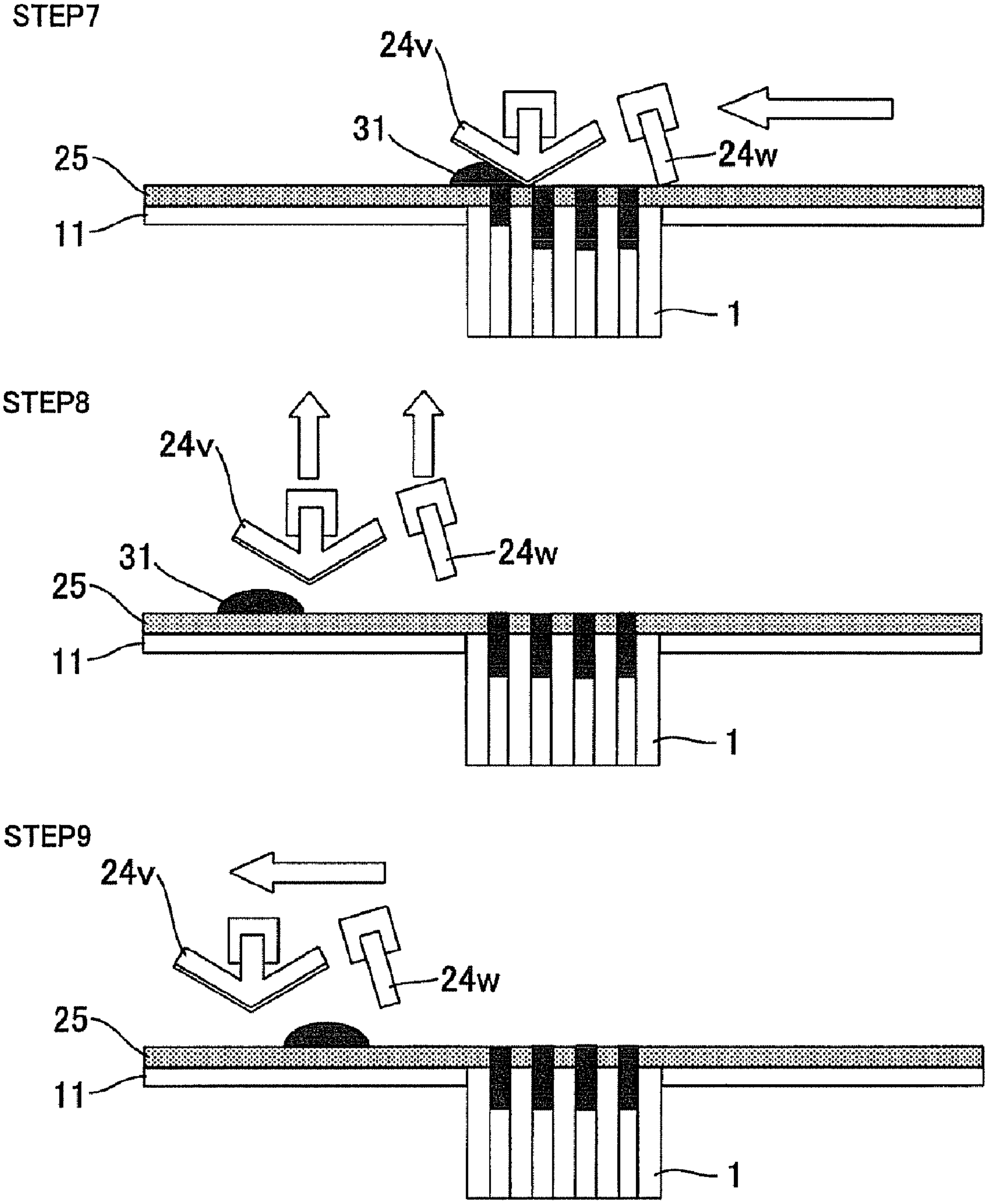
FIG. 25 is a diagram showing a plugging step following FIG. 24 of Embodiment 5.

Next, the V-shaped plugging apparatus 24*v* is raised as shown in the step 4 of FIG. 24 and moved to the place more apart from the honeycomb structure 1 than the plugging material 31 as shown in the step 5. Then, the V-shaped plugging apparatus 24*v* and the flat plugging apparatus 24*w* are moved down as shown in the step 6. With the V-shaped plugging apparatus 24*v* and the flat plugging apparatus 24*w* being moved in the backward direction as shown in the step 7 of FIG. 25, the plugging material 31 is filled by the second pressurizing face of the V-shaped plugging apparatus 24*v* and the flat plugging apparatus 24*w*. Next, the V-shaped plugging apparatus 24*v* and the flat plugging apparatus 24*w* are raised as shown in FIG. 8 and moved to the place more apart from the honeycomb structure 1 than the plugging material 31 as shown in FIG. 9 to complete plugging, followed by the plugging step for the next honeycomb structure 1.

Figure 26B:
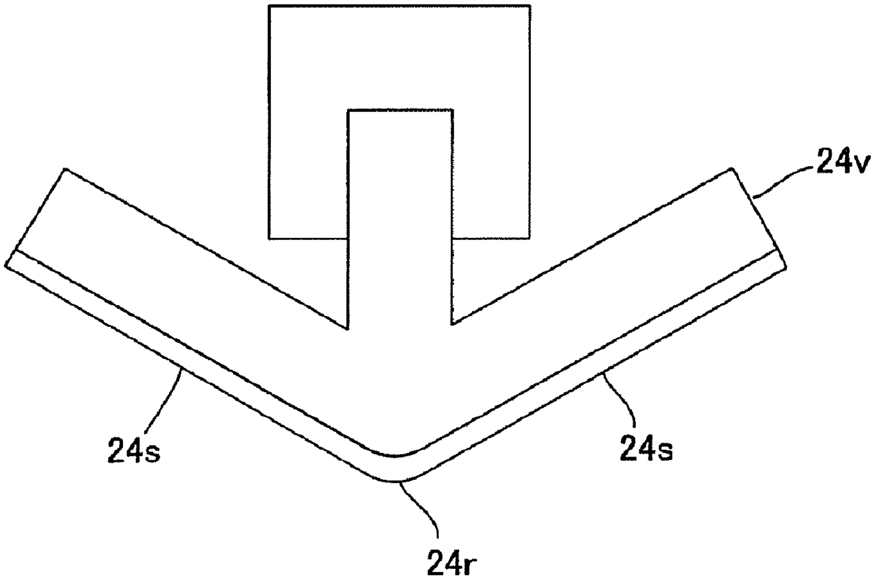
FIG. 26B is a diagram showing a modified example 1 of a V-shaped plugging apparatus.
Figure 26C:
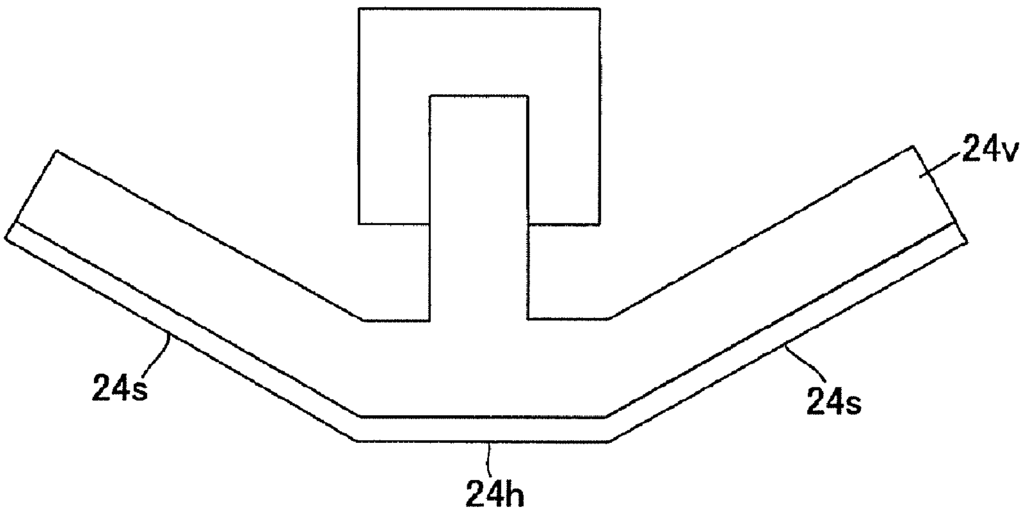
FIG. 26C is a diagram showing a modified example 2 of a shaped plugging apparatus.
Figure 26D:
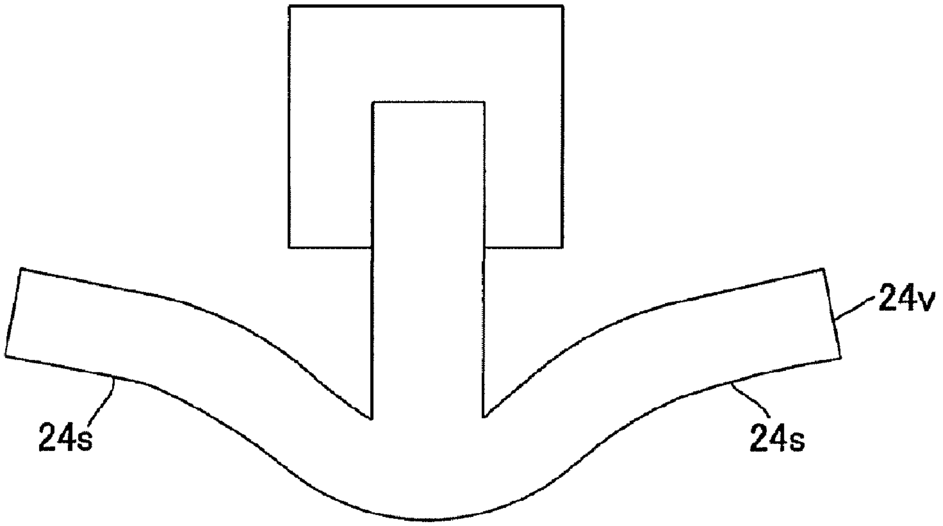
FIG. 26D is a diagram showing a modified example 3 of a V-shaped plugging apparatus.
Figure 26E:
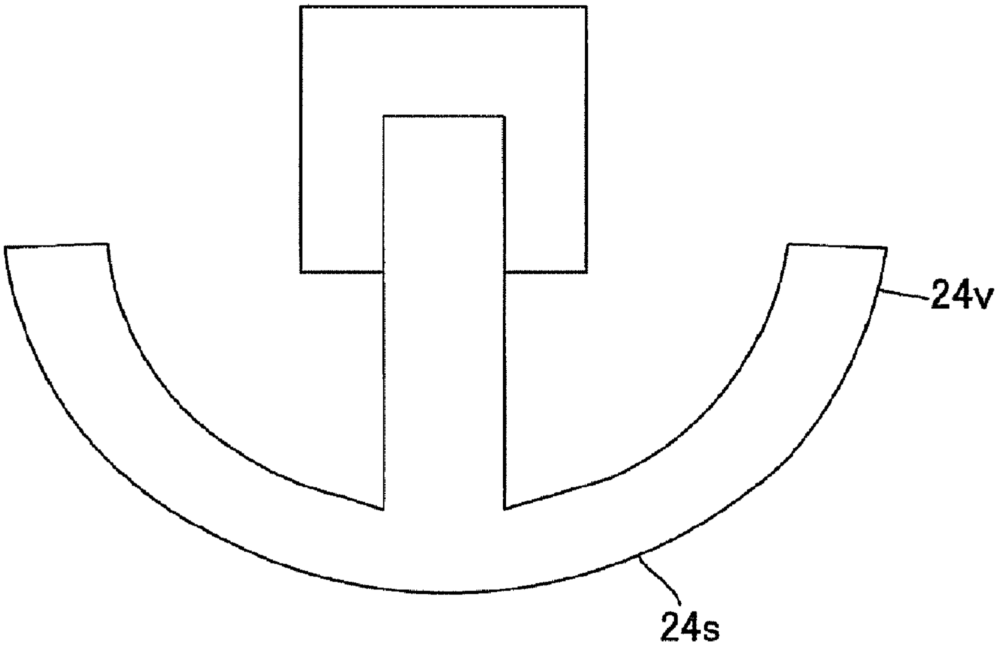
FIG. 26E is a diagram showing a modified example 4 of a V-shaped plugging apparatus.
Figure 26F:
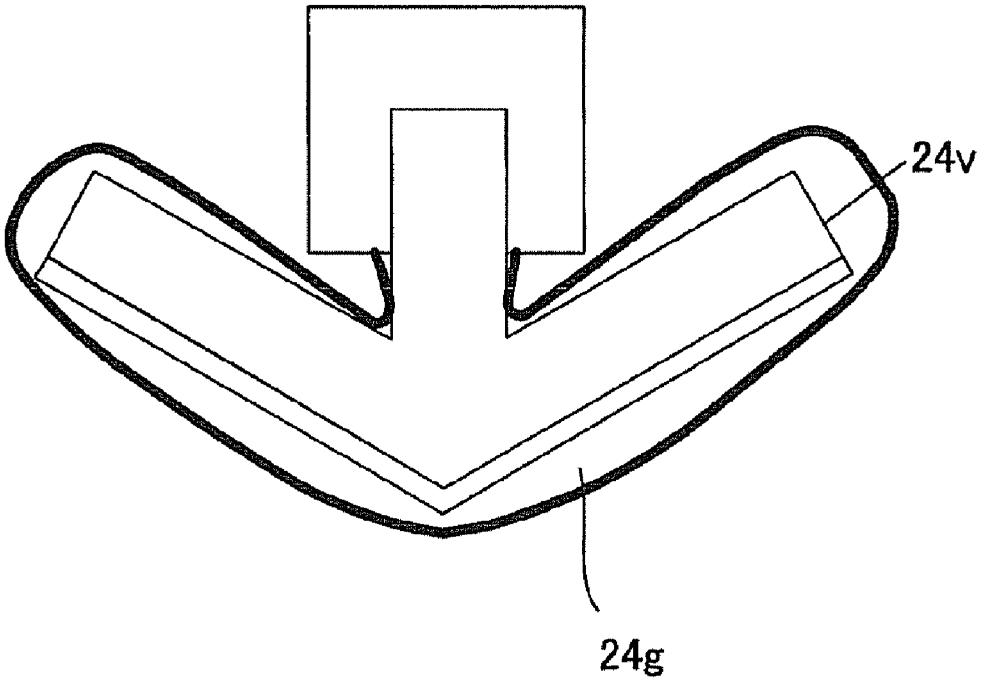
FIG. 26F is a diagram showing a modified example 5 of a shaped plugging apparatus.

FIGS. 26B to 26E show modified examples of the V-shaped plugging apparatus 24*v* capable of being used in Embodiment 5. As shown in FIG. 26B, the joint portion where the two pressurizing faces 24*s* are joined with each other may be an R joint portion 24*r* having an R shape. As shown in FIG. 26C, the joint portion where the two pressurizing faces 24*s* are joined with each other may be a flat joint portion 24*h* having a flat shape. As shown in FIG. 26D, the joint portion where the two pressurizing faces 24*s* are joined with each other may have an arc shape in such a manner that the slant on the end portion side with respect to the surface of the mask is mild. Further, as shown in FIG. 26E, the two pressurizing faces 24*s* and the joint portion where the pressurizing faces are joined with each other are curved in an arc shape. As shown in FIG. 26F, the constitution having a gap 24*g* between the plugging apparatus 24*v* and the elastic body may be employed.

Embodiment 6

In Embodiment 6, there is used a pressurizing means having the two slant faces, ie., the first pressurizing face and the second pressurizing face, where the lower end of the first pressurizing face and the lower end of the second pressurizing face are joined with each other to form a joint portion, the cross section is formed in a protruding shape by the first pressurizing face and the second pressurizing face with the joint portion as the tip portion, and a plugging material supply hole for supplying the plugging material having fluidity on the mask or on the table portion is formed on each of the first pressurizing face and the second pressurizing face.

Figure 29A:
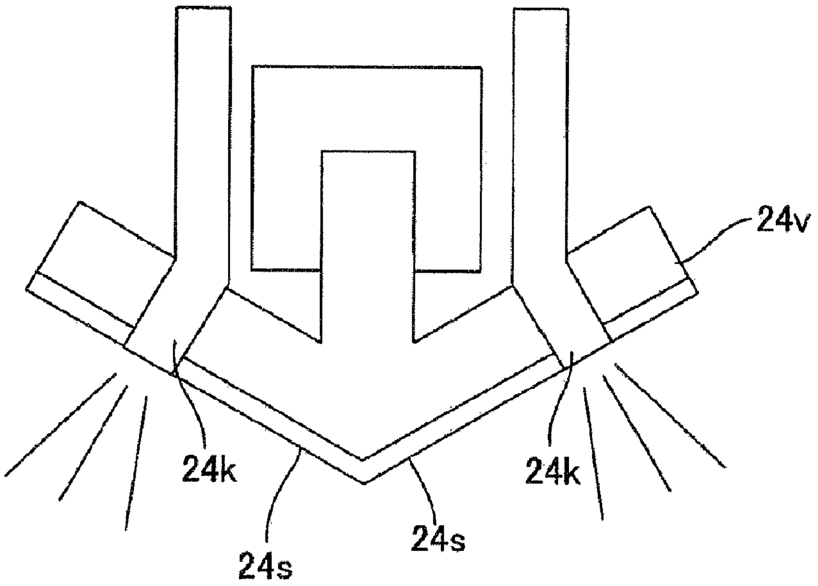
FIG. 29A is a diagram showing an embodiment of a V-shaped plugging apparatus having a plugging material supply hole formed therein.

As a pressurizing means, specifically, a V-shaped plugging apparatus 24*v* provided with plugging material supply holes 24*k* as shown in FIG. 29A is used. The V-shaped plugging apparatus 24*v* shown in FIG. 29A is formed in a V shape by disposing two pressurizing faces 24*s* with an angle of 2° or more and 55° or less with respect to the surface of the mask. Further, the pressurizing faces 24*s* are provided with the plugging material supply holes 24*k* in order to supply the plugging material on the mask.

Figure 27:
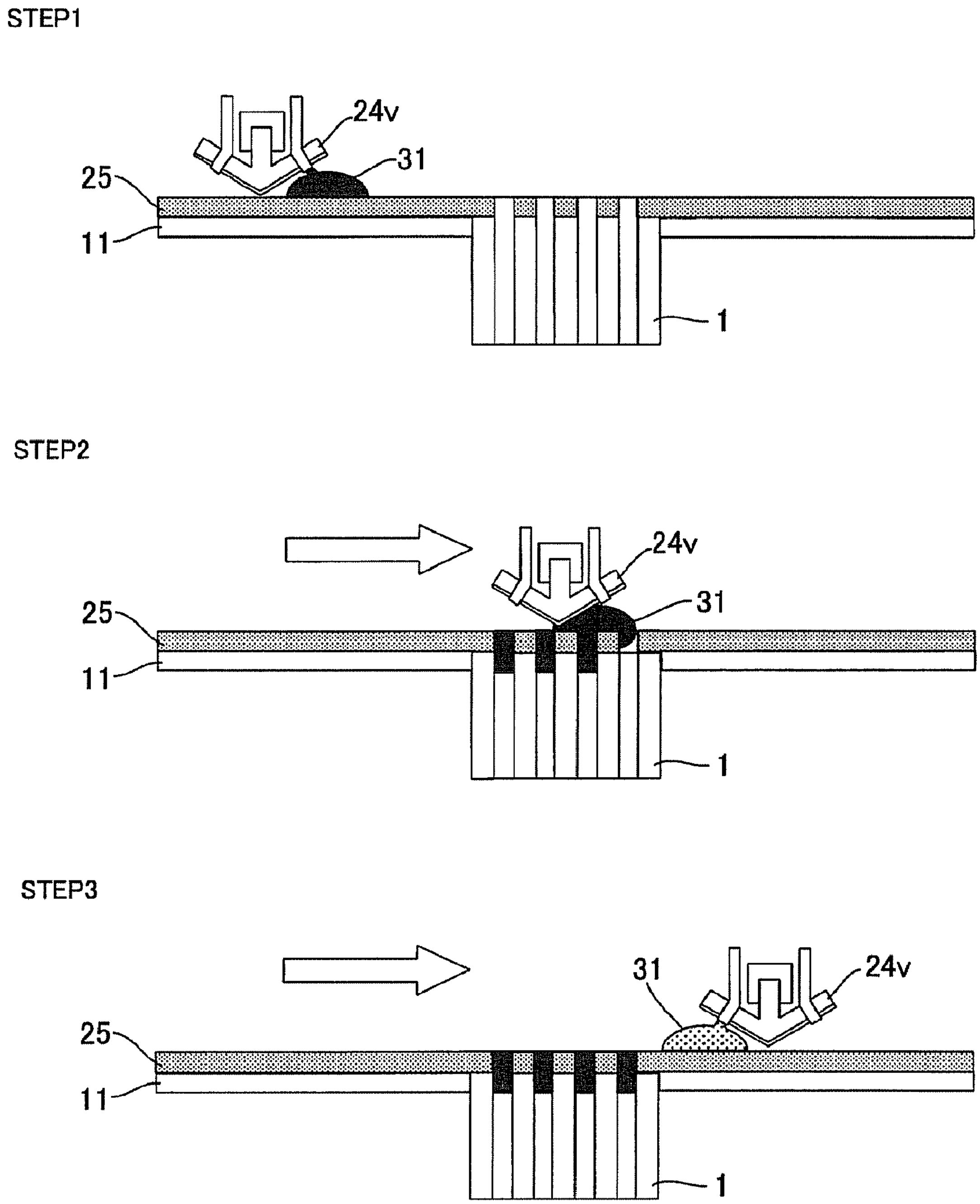
FIG. 27 is a diagram showing a plugging step of Embodiment 6.

Next, the plugging step of Embodiment 6 will be described. As shown in the step 1 of FIG. 27, the plugging material 31 having fluidity (slurry or paste) is supplied on the mask (film 25) having holes and disposed on the end face 8 of the honeycomb structure 1 positioned with respect to the table portion 11 from the plugging material supply hole 24*k*. Then, the plugging material 31 supplied on the mask is pressurized by the pressurizing face 24*s* of the V-shaped plugging apparatus 24*v* to fill the plugging material 31 into the cells 3 of the honeycomb structure 1.

Next, as shown in the step 3, the V-shaped plugging apparatus 24*v* is raised to be moved more apart from the honeycomb structure 1 than the plugging material 31 and moved down, and the plugging material 31 is supplied on the mask from the plugging material supply port 24*k*.

Figure 28:
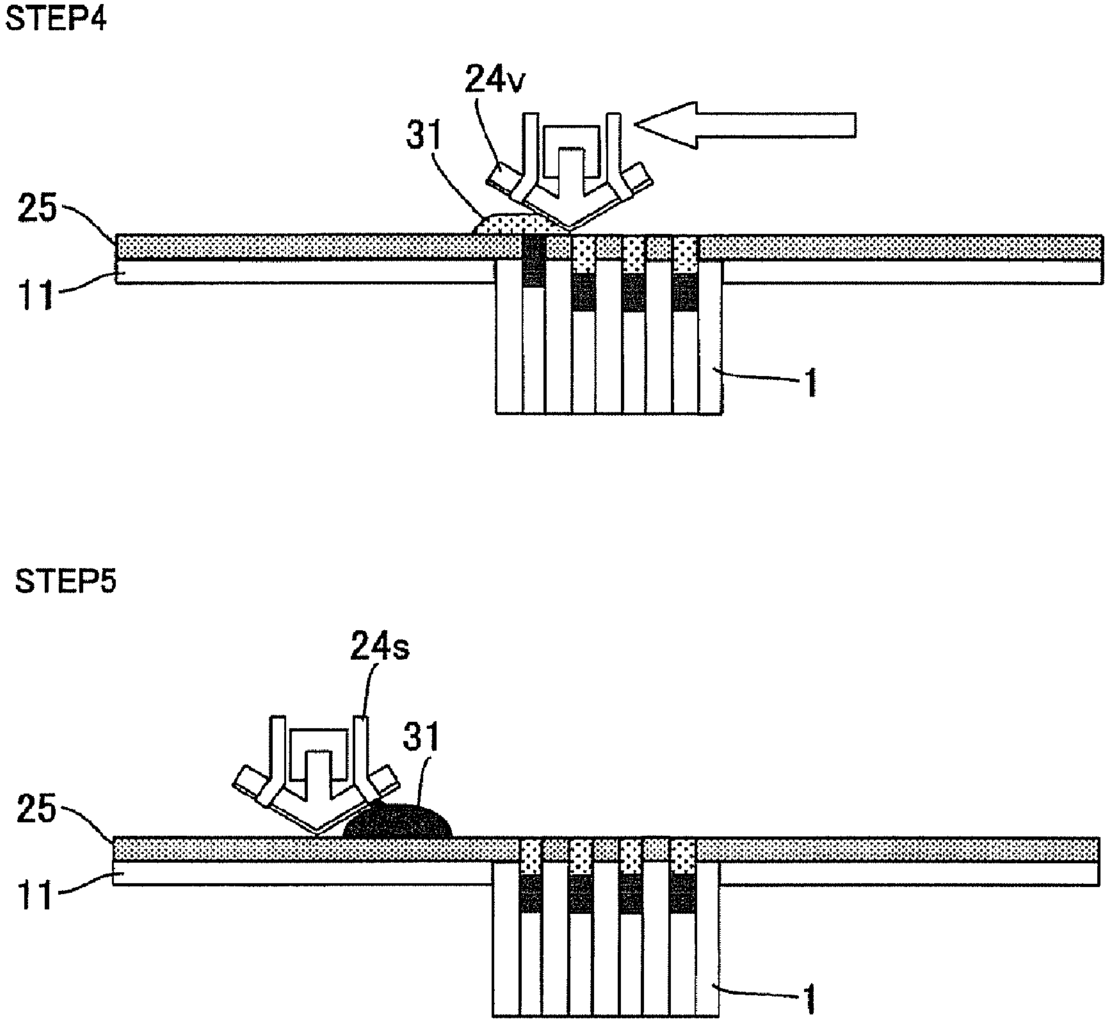
FIG. 28 is a diagram showing a plugging step following FIG. 27 of Embodiment 6.

Next, as shown in the step 4 of the FIG. 28, the plugging material 31 is filled by the V-shaped plugging apparatus 24*v*. Next, as shown in the step 5, the V-shaped plugging apparatus 24*v* is moved more apart from the honeycomb structure 1 than the plugging member 31 to complete plugging, followed by the plugging step for the next honeycomb structure 1.

Figure 29B:
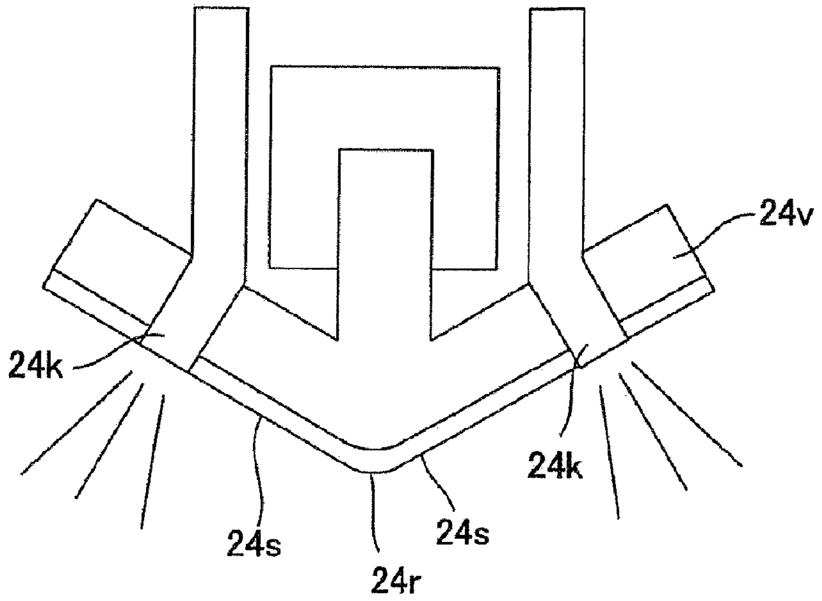
FIG. 29B is a diagram showing a modified example 1 of a V-shaped plugging apparatus having a plugging material supply hole formed therein.
Figure 29C:
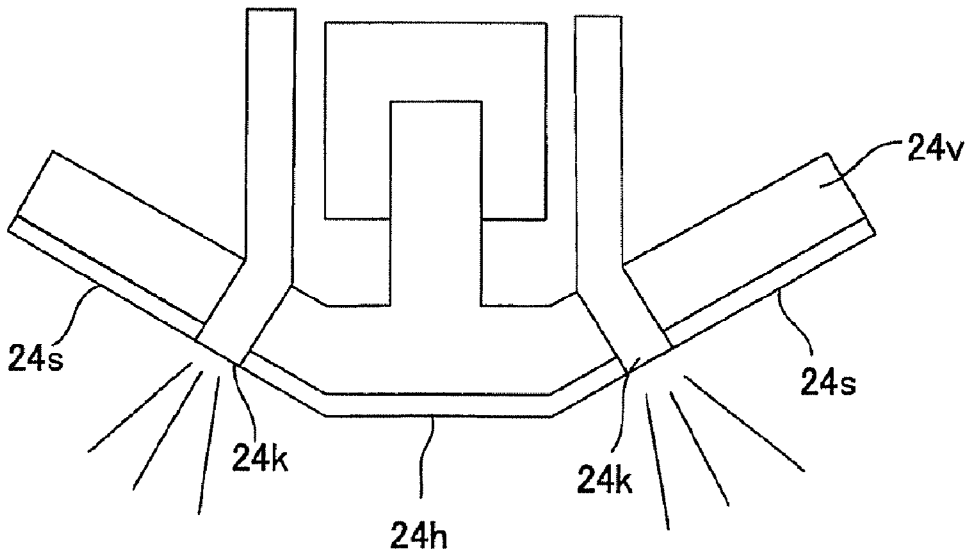
FIG. 29C is a diagram showing a modified example 2 of a shaped plugging apparatus having a plugging material supply hole formed therein.
Figure 29D:
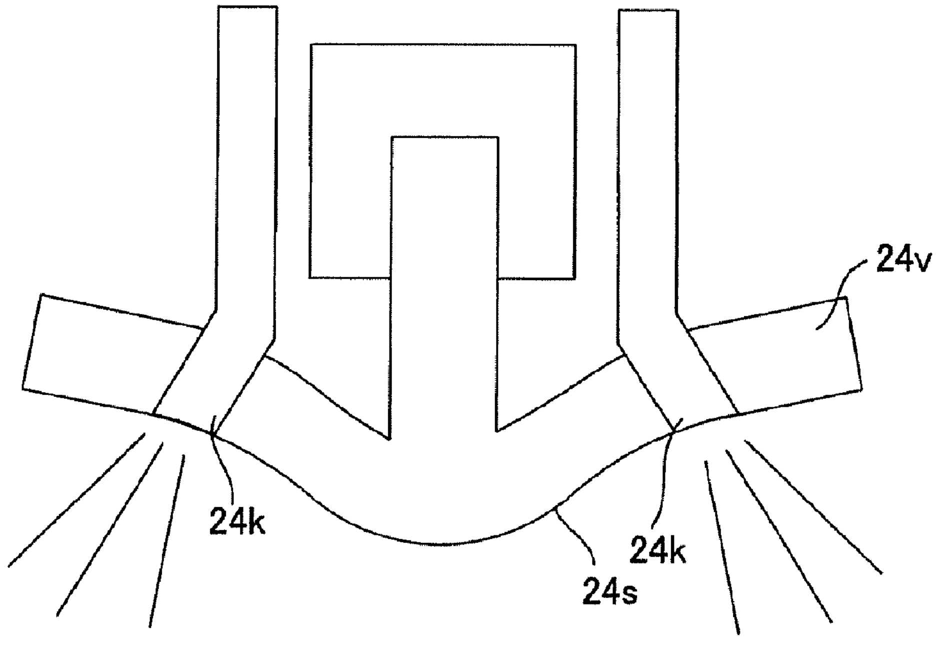
FIG. 29D is a diagram showing a modified example 3 of a V-shaped plugging apparatus having a plugging material supply hole formed therein.
Figure 29E:
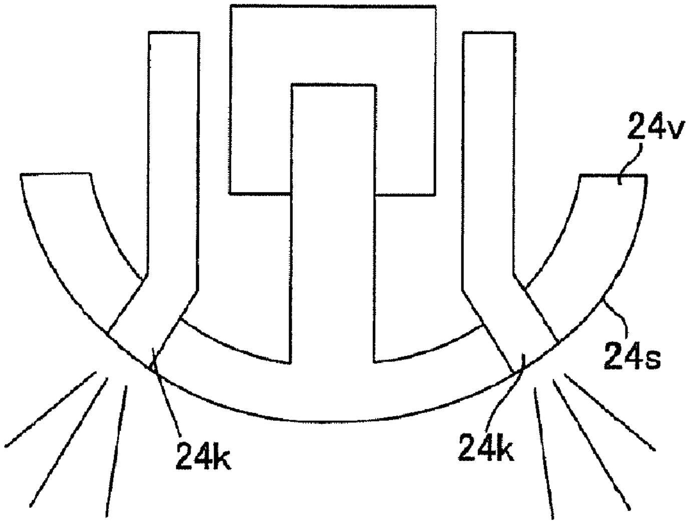
FIG. 29E is a diagram showing a modified example 4 of a V-shaped plugging apparatus having a plugging material supply hole formed therein.
Figure 29F:
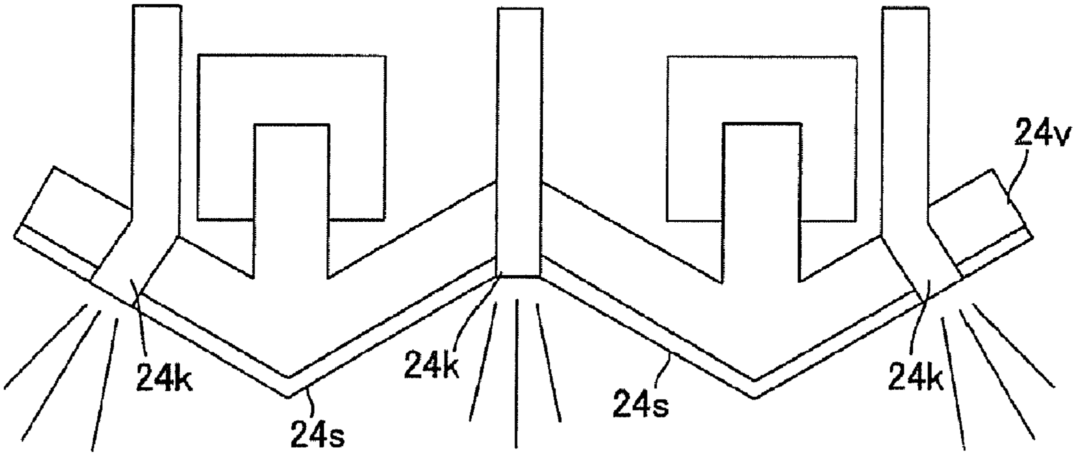
FIG. 29F is a diagram showing a modified example 5 of a V-shaped plugging apparatus having a plugging material supply hole formed therein.

FIGS. 29B to 29E show modified examples of the V-shaped plugging apparatus 24*v* usable in Embodiment 6. As shown in FIG. 29B, the joint portion where the two pressurizing faces 24*s* are joined with each other may be an R joint portion 24*r* having an R shape. As shown in FIG. 29C, the joint portion where the two pressurizing faces 24*s* are joined with each other may be a flat joint portion 24*h* having a flat shape. As shown in FIG. 29D, the joint portion where the two pressurizing faces 24*s* are joined with each other may have an arc shape in such a manner that the slant on the end portion side with respect to the surface of the mask is mild. Further, as shown in FIG. 29E, the two pressurizing faces 24*s* and the joint portion where the pressurizing faces are joined with each other are curved in an arc shape. As shown in FIG. 29F, the constitution having four pressurizing faces continuing to form a W shape may be employed.

Example

Hereinbelow, the present invention will be described in more details on the basis of Examples. However, the present invention is by no means limited to these Examples.

A honeycomb structure having a cell size of 2 mm×2 mm and a pitch of 5 mm was obtained by employing, as the main raw material, a ceramic selected from the group consisting of cordierite, mullite, alumina, silicon carbide, and a combination thereof, mixing water and a binder in the material, dispersion-mixing and kneading the material with a kneader, extruding the material into a cylindrical shape, and extrusion-forming the material by an extrusion-forming apparatus.

Next, a plurality of cells on both the end faces of the honeycomb dried body obtained above were alternately plugged according to the plugging step of the aforementioned Embodiment 4 (FIG. 15). The elastic ring used had an inner diameter of 188 mm, an outer diameter of 213 mm, and a thickness of 25 mm. At that time, printing pressure, plugging apparatus speed, and plugging apparatus angle were changed to investigate plugging depth.

The depth in the case of changing the plugging apparatus angle is shown in Table 1. Plugging was performed under a printing pressure of 0.4 MPa and a plugging apparatus of 50 mm/sec with using a plugging apparatus including urethane having a thickness of 3 mm and polyethylene having a thickness of 80 μm as shown in FIG. 20.

TABLE 1

Relation between plugging apparatus angle and depth

| Plugging apparatus angle (°) | Depth avg (mm) | Fluctuation σ (mm) |
|---|---|---|
| 1 | — | — |
| 2 | 1.8 | 0.36 |
| 9 | 4.3 | 0.35 |
| 10 | 4.5 | 0.32 |
| 30 | 2.4 | 0.21 |
| 45 | 1.8 | 0.24 |
| 55 | 1.2 | 0.30 |
| 60 | 1.1 | 0.50 |

The fluctuations in Table 1 were calculated out by measuring the plugging depth in 50 points. The plugging depth was measured by a length from the opposite side of the direction of plugging to the bottom face of the plugging, and the length was deducted from the entire size.

As shown in Table 1, the plugging apparatus angle was changed to change the plugging depth. In the case of the plugging apparatus angle of 1°, the measurement was impossible because a discharge amount required for plugging was not secured. However, in the range from 2° to 55°, the plugging could be performed with high accuracy. In the case of 60°, a large fluctuation was found in the plugging depth. In the range from 2° to 9°, plugging was possible with the depth of 1.8 to 4.3 mm and the fluctuation of 0.35 to 0.36. However, since the angle of 10° or more could give improved accuracy with a fluctuation of 0.32 or less, an angle of 10° to 55° was preferable.

Incidentally, though plugging was performed under a printing pressure of 0.1 MPa to 0.5 MPa and at a plugging apparatus speed of 10 mm/sec. to 300 mm/sec., the effect of the plugging apparatus angle was large in comparison with the printing pressure and the plugging apparatus speed, and there was no large change in plugging depth even by changing the printing pressure or the plugging apparatus speed.

The method for manufacturing a honeycomb structure and the manufacturing apparatus of the present invention can suitably be used as a means for manufacturing a honeycomb structure having plugging portions and being used as a carrier for a catalyst apparatus or as a filter for DPF or the like. In addition, it can suitably be used for via hole-filling or the like of a multilayered printed circuit board or the like.

What is claimed is:

1. A method for manufacturing a honeycomb structure having plugging portions, the honeycomb structure having porous partition walls and a plurality of cells partitioned by the partition walls and formed so as to extend through the honeycomb structure from one end face of the honeycomb structure to the other end face thereof, the method comprising the steps of:

attaching a mask having openings corresponding to openings of at least a part of the cells to the end faces of the honeycomb structure;

supplying a plugging material having fluidity on the mask or on the same plane as a surface of the mask; and moving a pressurizing member disposed at an acute angle with respect to the surface of the mask and having a pressurizing face for pressurizing the plugging material to fill the plugging material into the cells of the honeycomb structure by pressurizing the plugging material with the pressurizing face, wherein the pressurizing face is a flat face and is disposed at an angle of 2° to 55° with respect to the surface of the mask.

2. The method for manufacturing the honeycomb structure having plugging portions according to claim 1, wherein the mask is moved with a part of the pressurizing face being brought into contact with the mask via the plugging material to pressurize the plugging material toward the cell side and to push out an extra plugging material in the direction of movement of the mask, and the plugging material is filled into the cells with forming a region of face contact.

3. The method for manufacturing the honeycomb structure having plugging portion according to claim 1, wherein the honeycomb structure and the plugging material of the honeycomb structure contain a ceramic selected from the group consisting of cordierite, mullite, alumina, silicon carbide, and a combination thereof.

4. The method for manufacturing the honeycomb structure having plugging portions according to claim 1, wherein the mask is obtained by forming holes in the film by a laser after attaching the film to the end faces of the honeycomb structure.

5. The method for manufacturing the honeycomb structure having plugging portions according to claim 1, wherein, upon positioning a table portion having a through-hole where the end face portion of the honeycomb structure is to be inserted and the honeycomb structure by inserting the end face portion of the honeycomb structure, the mask is provided on the end face, a remaining portion of the mask is folded on the side face portion, an end portion on the end face side of the side face portion of the honeycomb structure where at least a part of the mask adheres to the side face portion is held with a sealing member to seal a gap between the side face portion of the honeycomb structure and the table portion with the sealing member, and a plugging material having fluidity is supplied onto the mask or the table portion on the same plane as the surface of the mask to fill the plugging material into the cells.

6. The method for manufacturing the honeycomb structure having plugging portions according to claim 5, wherein the sealing member is a hollow elastic ring, and sealing is performed by expanding the hollow elastic ring by air pressure.

7. A manufacturing apparatus for a honeycomb structure having plugging portions, the apparatus comprising:

a table portion having a through-hole into which an end face portion of a honeycomb structure is to be inserted, the honeycomb structure having porous partition walls and a plurality of cells partitioned by the partition walls and formed so as to extend through the honeycomb structure from one end face of the honeycomb structure to the other end face thereof;

a positioning means for positioning and holding the table portion and the honeycomb structure in a state that the end face portion of the honeycomb structure is inserted into the through-hole of the table portion;

a plugging material supply means for supplying a plugging material having fluidity onto the mask or onto the table portion in a state that the mask having openings corresponding with openings of at least a part of the cells is disposed on the end face of the honeycomb structure; and a pressurizing member having a pressurizing face disposed at an acute angle with respect to a surface of the mask and applying pressure to the plugging material and a moving means for moving the honeycomb structure on the tablet wherein the pressurizing face is a flat face and forms an angle of 2° to 55° with respect to the surface of the mask;

wherein, after supplying the plugging material on the mask of the honeycomb structure positioned with respect to the table portion or on the table portion, the pressurizing means moves on the table portion, thereby pressurizing the plugging material supplied on the mask by the pressurizing face to fill the plugging material into the cells of the honeycomb structure.

8. The manufacturing apparatus for a honeycomb structure having plugging portions according to claim 7, wherein the pressurizing face is capable of elastic deformation and wherein a part of the pressurizing face is brought into surface contact with the mask via the plugging material, moves on the mask to pressurize the plugging material toward the cell side and to push out an extra plugging material in a moving direction, and further pressurizing and filling the plugging material into the cells with forming a region of surface contact.

9. The manufacturing apparatus for a honeycomb structure having plugging portions according to claim 7, wherein the plugging material supply means is provided on the pressurizing means and moves unitarily with the pressurizing means.

10. The manufacturing apparatus for a honeycomb structure having plugging portions according to claim 7, wherein the mask is a film attached so as to cover the end face of the honeycomb structure.

11. The manufacturing apparatus for a honeycomb structure having plugging portions according to claim 7, wherein the pressurizing means includes a pressurizing mechanism for moving the pressurizing face in a direction perpendicular to the surface of the mask and a driving mechanism for moving the pressurizing face along the surface of the mask.

12. The manufacturing apparatus for a honeycomb structure having plugging portions according to claim 7, wherein the table portion has side wall portions formed to protrude from the surface in parallel with the moving direction of the pressurizing means on both sides of the through-hole on the surface of the table portion and inhibiting the plugging material from leaking out from the surface of the table portion.

13. The manufacturing apparatus for a honeycomb structure having plugging portions according to claim 7, wherein the apparatus has a sealing mechanism for inhibiting the extra plugging material pushed out by the pressurizing face by sealing the gap between the side face portion of the honeycomb structure and the table portion with a sealing member by holding an end portion on the end face side of the side face portion of the honeycomb structure where the mask is provided on the end face in the state that the remaining portion of the mask is folded toward the side face portion and that at least a part of the mask is adhered to the side face portion with the sealing member whose contact portion with the side face portion of the honeycomb structure is constituted to be movable upon positioning the table portion and the honeycomb structure by inserting the end face portion of the honeycomb structure into the through-hole of the table portion.

14. The manufacturing apparatus for a honeycomb structure having plugging portions according to claim 13, wherein the sealing member is a hollow elastic ring and wherein sealing is performed by expanding the hollow elastic ring by air pressure to seal.

15. The manufacturing apparatus for a honeycomb structure having plugging portions according to claim 7, wherein the pressurizing means has the first pressurizing face and the second pressurizing face as two slant faces, the lower ends of the first pressurizing face and the second pressurizing face are connected with each other to form a joint portion, a cross section is formed in a protruding shape by the first pressurizing face and the second pressurizing face with the joint portion as a tip portion, the pressurizing means moves in a forward direction on the table portion to fill the plugging material by the first pressurizing face and a backward direction to fill the plugging material by the second pressurizing face.

16. The manufacturing apparatus for a honeycomb structure having plugging portions according to claim 15, wherein a plugging material supply hole for supplying the plugging material having fluidity on the mask or on the table portion is formed on the first pressurizing face and the second pressurizing face.

17. A method for manufacturing a honeycomb structure having plugging portions, the honeycomb structure having porous partition walls and a plurality of cells partitioned by the partition walls and formed so as to extend through the honeycomb structure from one end face of the honeycomb structure to the other end face thereof, the method comprising the steps of: attaching a mask having openings corresponding to openings of at least a part of the cells to the end faces of the honeycomb structure; supplying a plugging material having fluidity on the mask or on the same plane as a surface of the mask; and moving a pressurizing member disposed at an acute angle greater than 0 degrees and less than 90 degrees with respect to the surface of the mask and having a pressurizing face for pressurizing the plugging material to fill the plugging material into the cells of the honeycomb structure by pressurizing the plugging material with the pressurizing face, wherein the pressurizing face is a curved face protruding toward the mask side.

18. The method for manufacturing the honeycomb structure having plugging portions according to claim 17, wherein the mask is moved with a part of the pressurizing face being brought into contact with the mask via the plugging material to pressurize the plugging material toward the cell side and to push out an extra plugging material in the direction of movement of the mask, and the plugging material is filled into the cells with forming a region of face contact.

19. The method for manufacturing the honeycomb structure having plugging portion according to claim 17, wherein the honeycomb structure and the plugging material of the honeycomb structure contain a ceramic selected from the group consisting of cordierite, mullite, alumina, silicon carbide, and a combination thereof.

20. The method for manufacturing the honeycomb structure having plugging portions according to claim 17, wherein the mask is obtained by forming holes in the film by a laser after attaching the film to the end faces of the honeycomb structure.

21. The method for manufacturing the honeycomb structure having plugging portions according to claim 17, wherein, upon positioning a table portion having a through-hole where the end face portion of the honeycomb structure is to be inserted and the honeycomb structure by inserting the end face portion of the honeycomb structure, the mask is provided on the end face, a remaining portion of the mask is folded on the side face portion, an end portion on the end face side of the side face portion of the honeycomb structure where at least a part of the mask adheres to the side face portion is held with a sealing member to seal a gap between the side face portion of the honeycomb structure and the table portion with the sealing member, and a plugging material having fluidity is supplied onto the mask or the table portion on the same plane as the surface of the mask to fill the plugging material into the cells.

22. The method for manufacturing the honeycomb structure having plugging portions according to claim 17, wherein the sealing member is a hollow elastic ring, and sealing is performed by expanding the hollow elastic ring by air pressure.

23. A manufacturing apparatus for a honeycomb structure having plugging portions, the apparatus comprising: a table portion having a through-hole into which an end face portion of a honeycomb structure is to be inserted, the honeycomb structure having porous partition walls and a plurality of cells partitioned by the partition walls and formed so as to extend through the honeycomb structure from one end face of the honeycomb structure to the other end face thereof; a positioning means for positioning and holding the table portion and the honeycomb structure in a state that the end face portion of the honeycomb structure is inserted into the through-hole of the table portion; a plugging material supply means for supplying a plugging material having fluidity onto the mask or onto the table portion in a state that the mask having openings corresponding with openings of at least a part of the cells is disposed on the end face of the honeycomb structure; and a pressurizing member having a pressurizing face disposed at an acute angle greater than 0 degree and less 90 degrees with respect to a surface of the mask and applying pressure to the plugging material and a moving means for moving the honeycomb structure on the table, wherein the pressurizing face is a curved face protruding toward the mask side; wherein, after supplying the plugging material on the mask of the honeycomb structure positioned with respect to the table portion or on the table portion, the pressurizing means moves on the table portion, thereby pressurizing the plugging material supplied on the mask by the pressurizing face to fill the plugging material into the cells of the honeycomb structure.

24. The manufacturing apparatus for a honeycomb structure having plugging portions according to claim 23, wherein the pressurizing face is capable of elastic deformation and wherein a part of the pressurizing face is brought into surface contact with the mask via the plugging material, moves on the mask to pressurize the plugging material toward the cell side and to push out an extra plugging material in a moving direction, and further pressurizing and filling the plugging material into the cells with forming a region of surface contact.

25. The manufacturing apparatus for a honeycomb structure having plugging portions according to claim 17, wherein the plugging material supply means is provided on the pressurizing means and moves unitarily with the pressurizing means.

26. The manufacturing apparatus for a honeycomb structure having plugging portions according to claim 23, wherein the mask is a film attached so as to cover the end face of the honeycomb structure.

27. The manufacturing apparatus for a honeycomb structure having plugging portions according to claim 23, wherein the pressurizing means includes a pressurizing mechanism for moving the pressurizing face in a direction perpendicular to the surface of the mask and a driving mechanism for moving the pressurizing face along the surface of the mask.

28. The manufacturing apparatus for a honeycomb structure having plugging portions according to claim 23, wherein the table portion has side wall portions formed to protrude from the surface in parallel with the moving direction of the pressurizing means on both sides of the through-hole on the surface of the table portion and inhibiting the plugging material from leaking out from the surface of the table portion.

29. The manufacturing apparatus for a honeycomb structure having plugging portions according to claim 23, wherein the apparatus has a sealing mechanism for inhibiting the extra plugging material pushed out by the pressurizing face by sealing the gap between the side face portion of the honeycomb structure and the table portion with a sealing member by holding an end portion on the end face side of the side face portion of the honeycomb structure where the mask is provided on the end face in the state that the remaining portion of the mask is folded toward the side face portion and that at least a part of the mask is adhered to the side face portion with the sealing member whose contact portion with the side face portion of the honeycomb structure is constituted to be movable upon positioning the table portion and the honeycomb structure by inserting the end face portion of the honeycomb structure into the through-hole of the table portion.

30. The manufacturing apparatus for a honeycomb structure having plugging portions according to claim 29, wherein the sealing member is a hollow elastic ring and wherein sealing is performed by expanding the hollow elastic ring by air pressure to seal.

31. The manufacturing apparatus for a honeycomb structure having plugging portions according to claim 23, wherein the pressurizing member, the first pressurizing face and the second pressurizing face has two slant faces, the lower ends of the first pressurizing face and the second pressurizing face are connected with each other to form a joint portion, a cross section is formed in a protruding shape by the first pressurizing face and the second pressurizing face with the joint portion as a tip portion, the pressurizing means moves in a forward direction on the table portion to fill the plugging material by the first pressurizing face and a backward direction to fill the plugging material by the second pressurizing face.

32. The manufacturing apparatus for a honeycomb structure having plugging portions according to claim 31, wherein a plugging material supply hole for supplying the plugging material having fluidity on the mask or on the table portion is formed on the first pressurizing face and the second pressurizing face.

* * * * *